May 18, 1937. C. J. KELLER 2,081,038
APPARATUS FOR FORMING TUBULAR ARTICLES
Filed Aug. 31, 1933 19 Sheets-Sheet 1

INVENTOR
Clarence J. Keller
BY
Spencer Hardman & Fehr
his ATTORNEYS

May 18, 1937.  C. J. KELLER  2,081,038
APPARATUS FOR FORMING TUBULAR ARTICLES
Filed Aug. 31, 1933  19 Sheets-Sheet 2

INVENTOR
Clarence J. Keller
BY
Spencer Hardman & Fehr
his ATTORNEYs

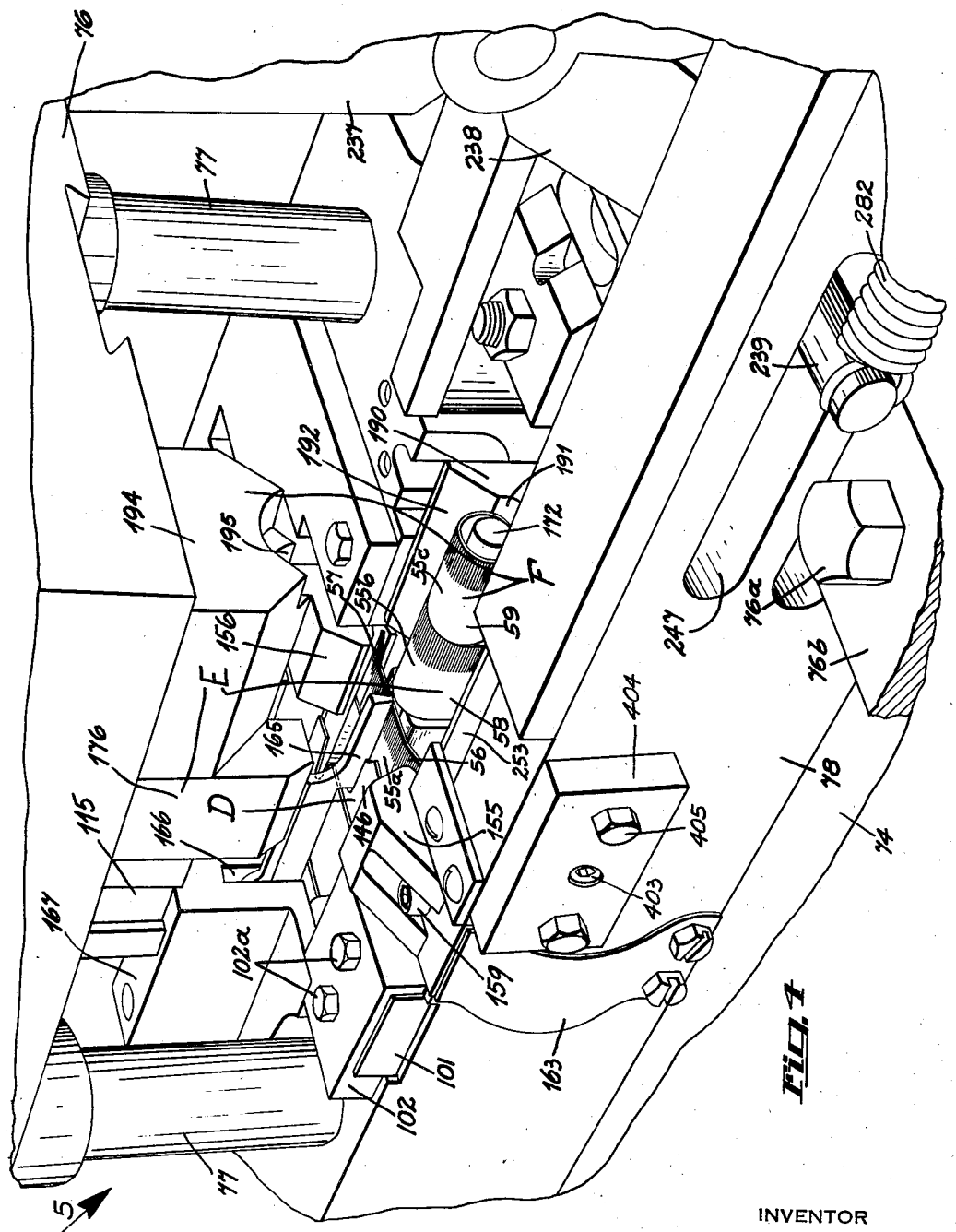

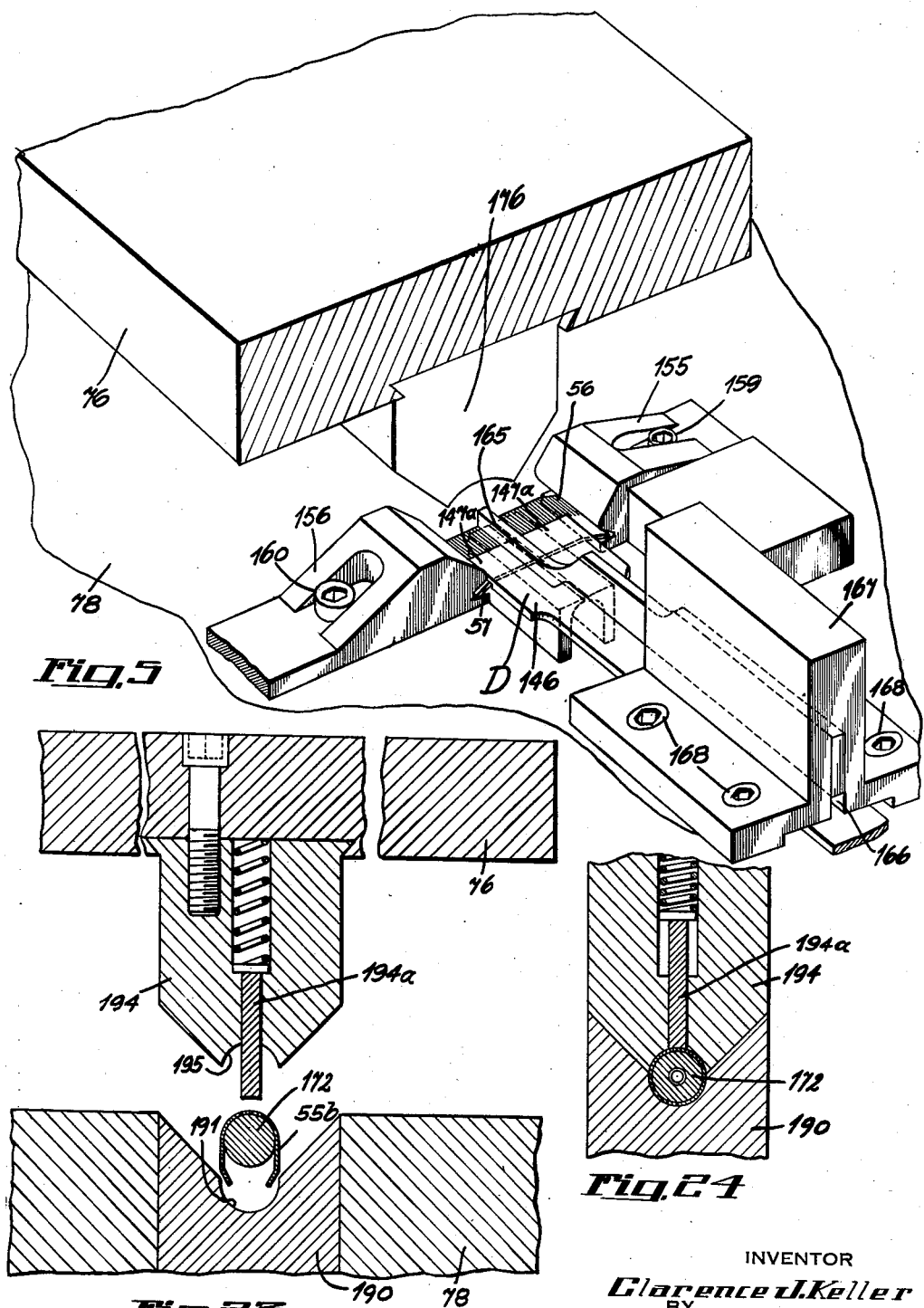

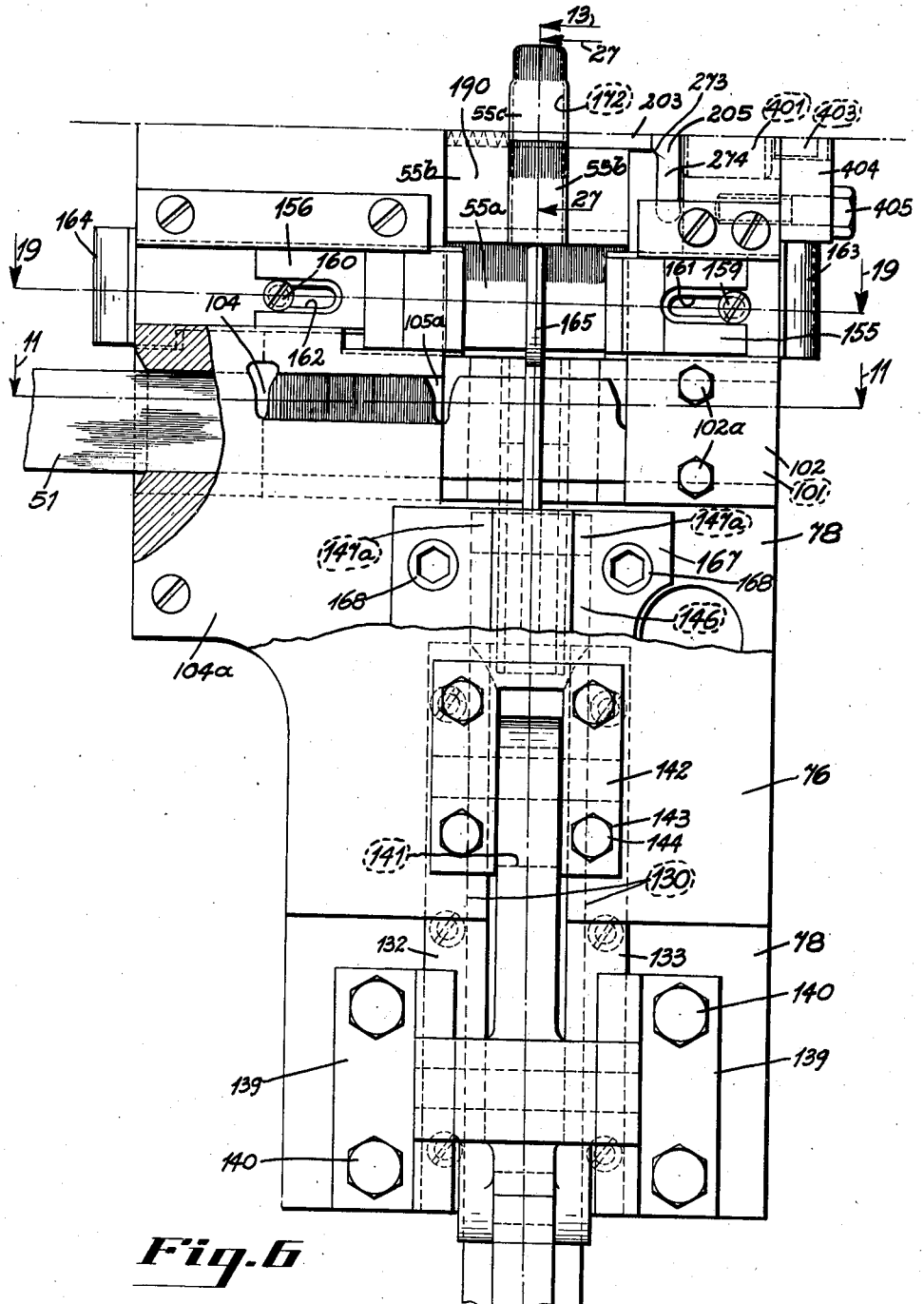

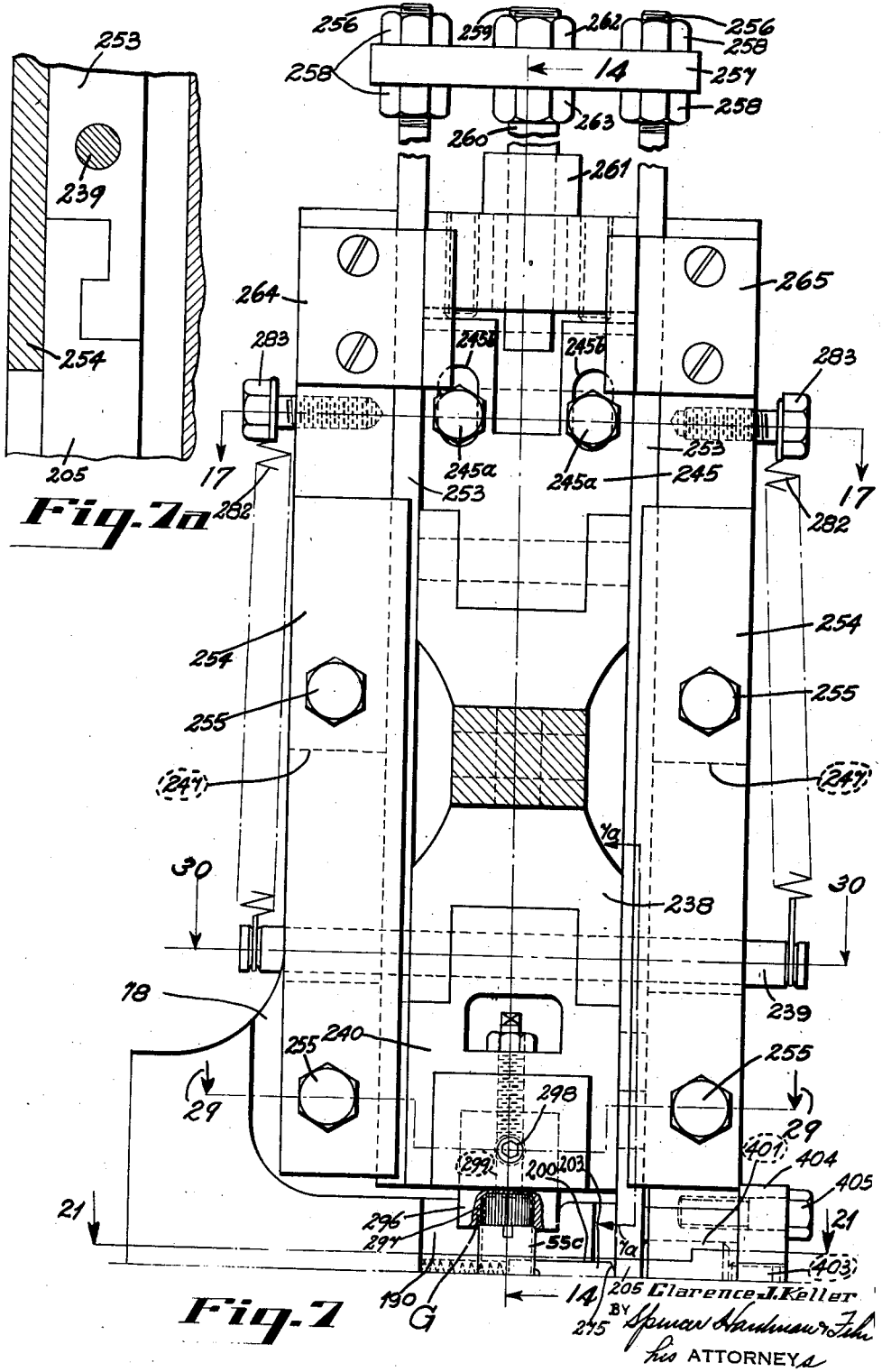

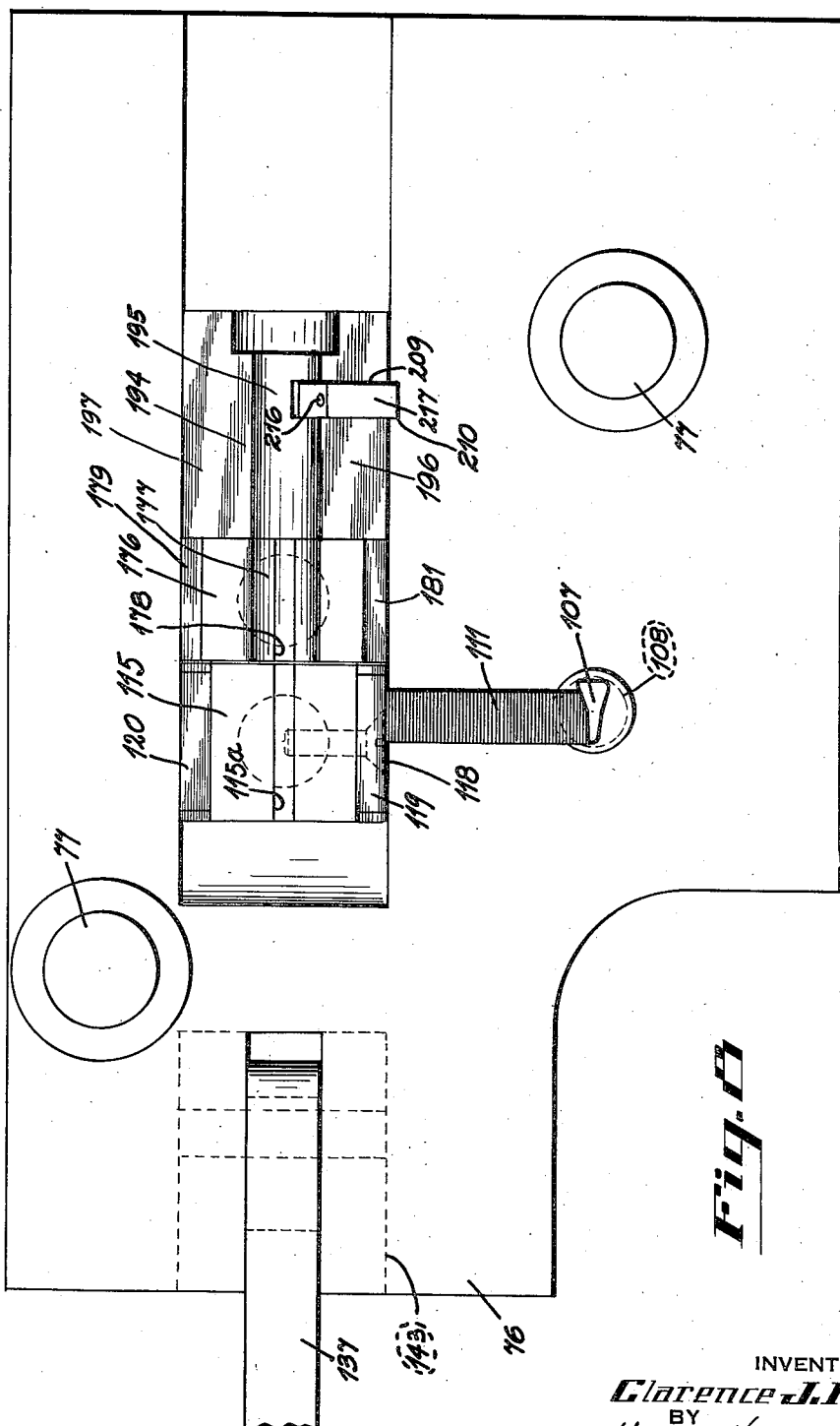

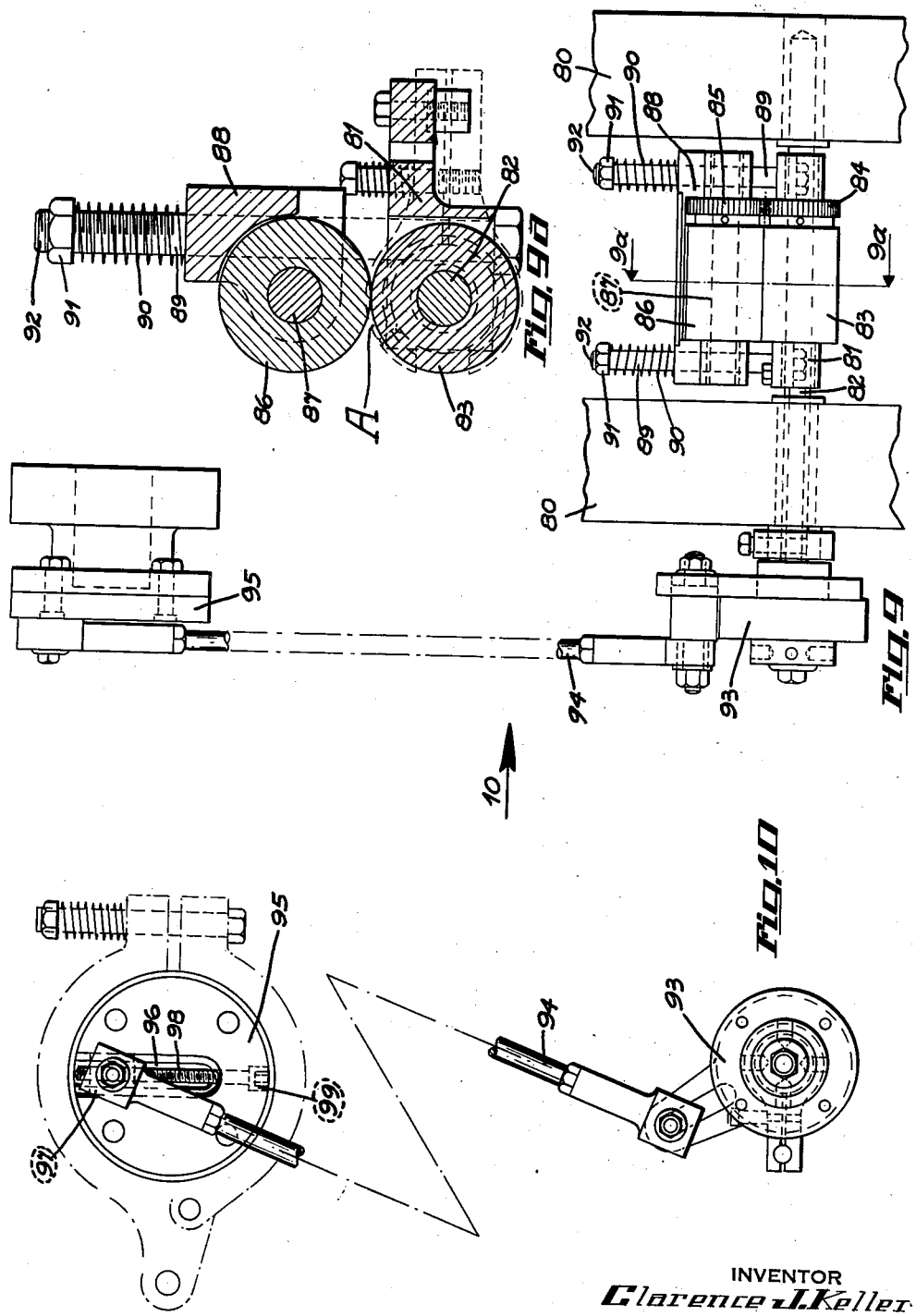

May 18, 1937.                    C. J. KELLER                    2,081,038
                    APPARATUS FOR FORMING TUBULAR ARTICLES
                    Filed Aug. 31, 1933            19 Sheets-Sheet 11

May 18, 1937.    C. J. KELLER    2,081,038
APPARATUS FOR FORMING TUBULAR ARTICLES
Filed Aug. 31, 1933    19 Sheets-Sheet 13

INVENTOR
*Clarence J. Keller*
BY
*Spencer Hardman Fehr*
his ATTORNEYs

May 18, 1937.  C. J. KELLER  2,081,038
APPARATUS FOR FORMING TUBULAR ARTICLES
Filed Aug. 31, 1933  19 Sheets-Sheet 14

INVENTOR
Clarence J. Keller
BY
Spencer Hardman & Fish
his ATTORNEYs

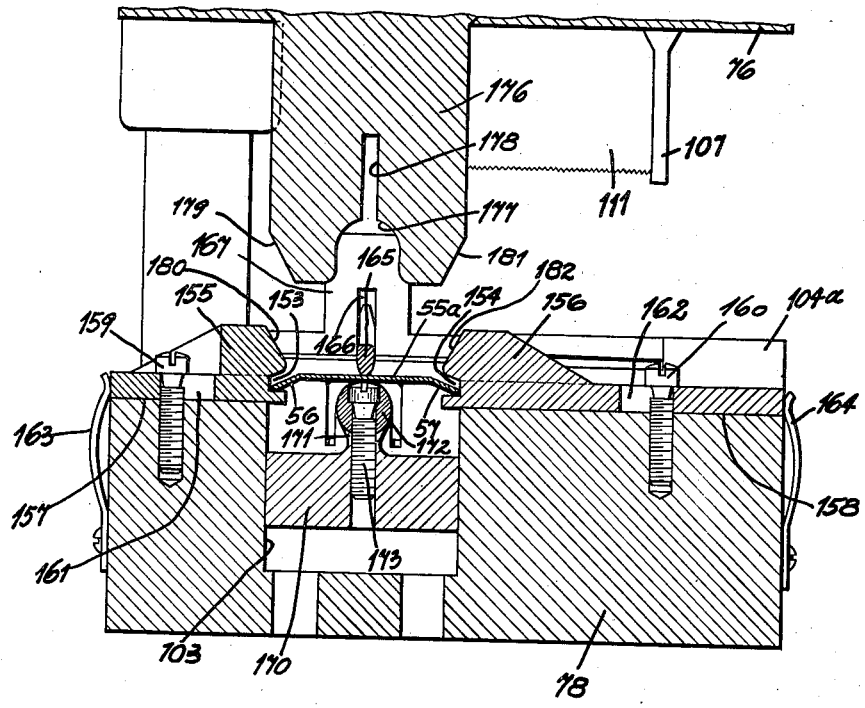

May 18, 1937. C. J. KELLER 2,081,038
APPARATUS FOR FORMING TUBULAR ARTICLES
Filed Aug. 31, 1933 19 Sheets-Sheet 16

INVENTOR
Clarence J. Keller
BY
Spencer Hardman & Fehr
his ATTORNEYS

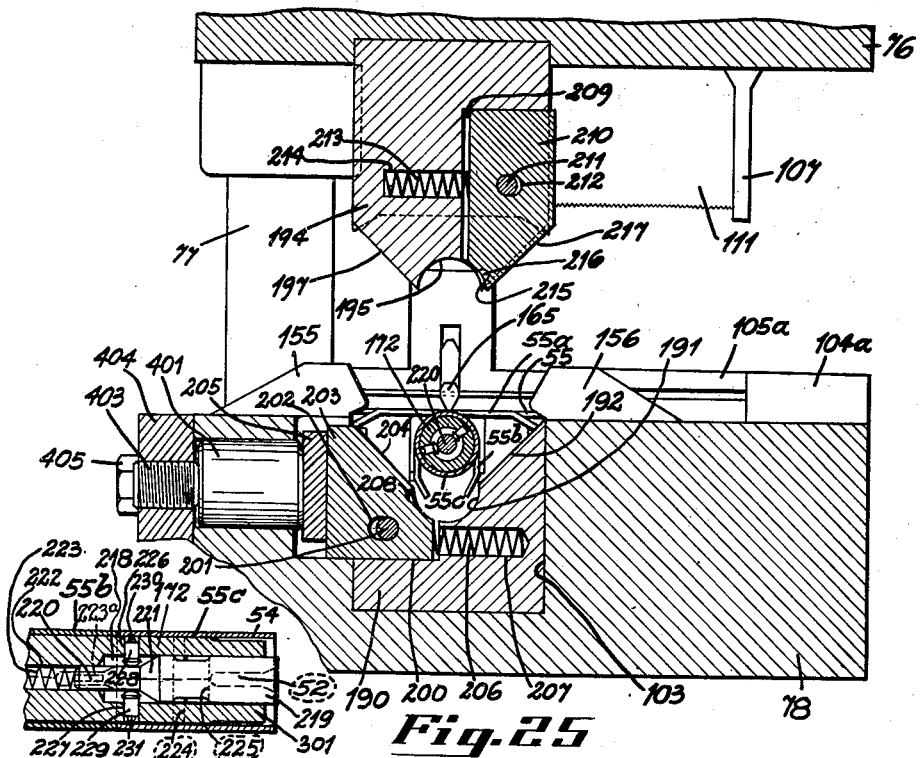

May 18, 1937.  C. J. KELLER  2,081,038
APPARATUS FOR FORMING TUBULAR ARTICLES
Filed Aug. 31, 1933   19 Sheets-Sheet 18

INVENTOR
Clarence J. Keller
BY
his ATTORNEYs

Patented May 18, 1937

2,081,038

UNITED STATES PATENT OFFICE 2,081,038

APPARATUS FOR FORMING TUBULAR ARTICLES

Clarence J. Keller, Anderson, Ind., assignor, by mesne assignments, to General Motors Corporation, Detroit, Mich., a corporation of Delaware Application August 31, 1933, Serial No. 687,621

89 Claims. (Cl. 29—33)

This invention relates to the manufacture of tubular articles and more particularly to an apparatus for forming tubular articles from a continuous strip of sheet material.

It is an object of the present invention to provide for the forming of tubular articles through progressive stages from a continuous strip of sheet material in an expeditious manner and with the least possible amount of scrap material.

Another object of the present invention is to provide for knurling a portion of a tubular article.

Another object of the present invention is to provide for the contraction of an end portion of a tubular article to reduce the same.

Another object of the present invention is to provide for crimping an end portion of a tubular article into a flange extending transversely of the axis of the article.

Another object of the present invention is to provide for the formation of raised beads in the periphery of a tubular article.

Still another object of the present invention is to provide for the formation of a sunken bead in the periphery of a tubular article.

Further objects and advantages of the present invention will be apparent from the following description, reference being had to the accompanying drawings wherein a preferred embodiment of one form of the present invention is clearly shown.

In the drawings:

Fig. 3 is another fragmentary perspective view of the machine, viewed in the direction of arrow 3 in Fig. 2.

Fig. 4 is an enlarged fragmentary perspective view of a portion of the machine looking in the direction of the arrow 4 in Fig. 3.

Fig. 5 is another enlarged fragmentary perspective view of the machine looking in the direction of arrow 5 in Fig. 4.

Figs. 6 and 7 together are a plan view of the lower die plate and the parts carried thereby.

Fig. 7a is a fragmentary sectional view taken on the line 7a—7a of Fig. 7.

Fig. 8 is a bottom view of the upper die plate and parts carried thereby.

Fig. 9 discloses the feeding device and its operating parts.

Fig. 9a is an enlarged sectional view showing the cooperation between the two feed rolls and is taken on the line 9a—9a of Fig. 9.

Fig. 10 is a side elevation of the feeding device and its operating parts, viewed in the direction of arrow 10 in Fig. 9.

Figure 11:
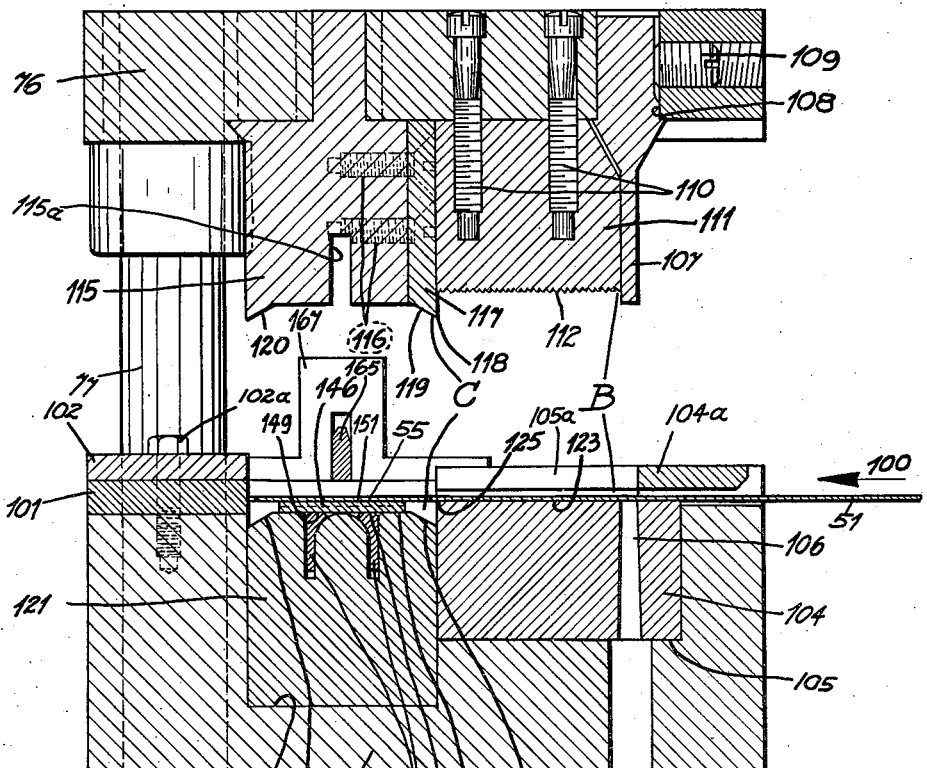

Fig. 11 is a sectional view of cooperating members, carried by the lower and upper die plates, and is taken along the line 11—11 of Fig. 6.

Figure 12:
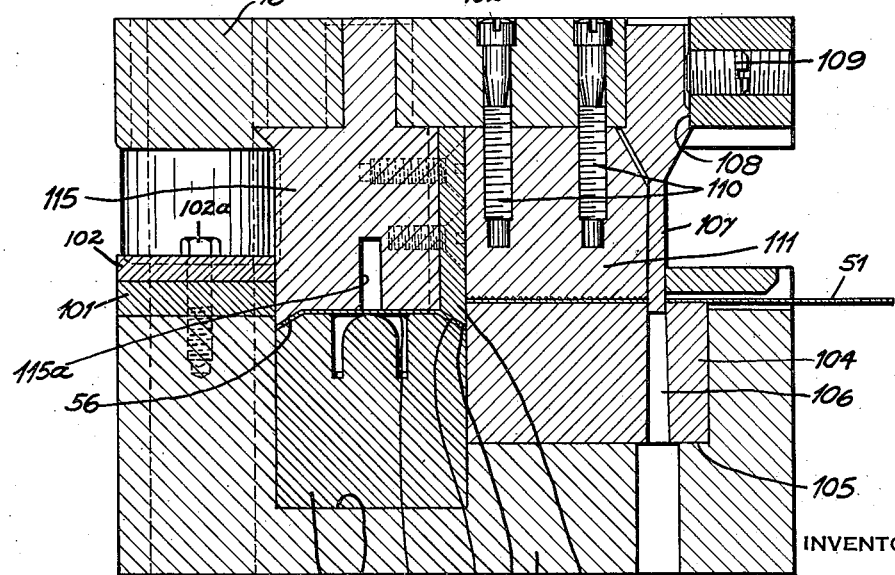

Fig. 12 is a view similar to Fig. 11, showing, however, the upper die plates and parts carried thereby in a different relative position.

Figure 13:
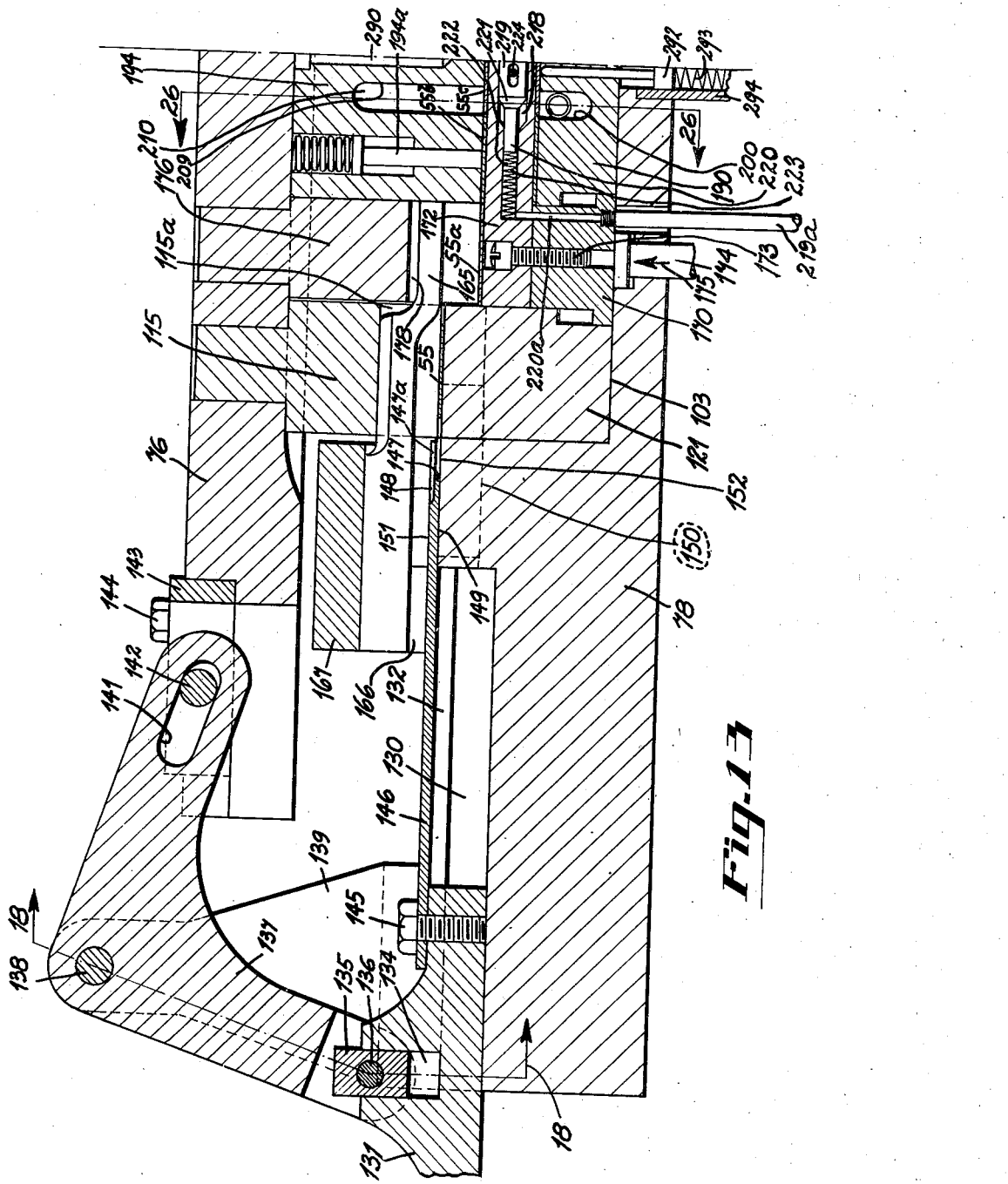
Figure 14:
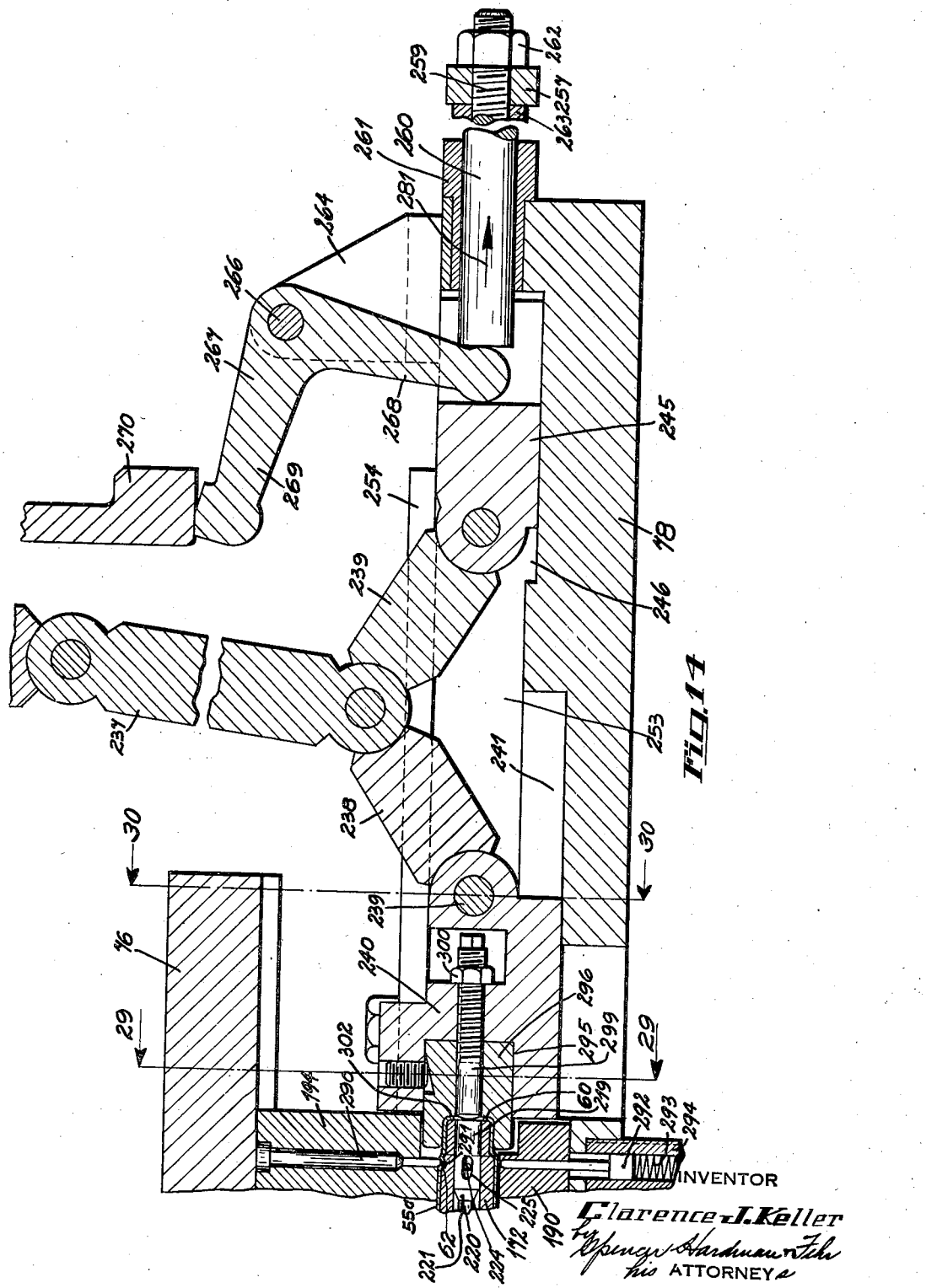

Figs. 13 and 14 together are a cross-sectional view of the upper and lower die plate with the parts carried thereby in operative position. The section being taken on the lines 13—13 and 14—14 of Figs. 6 and 7, respectively.

Figure 15:
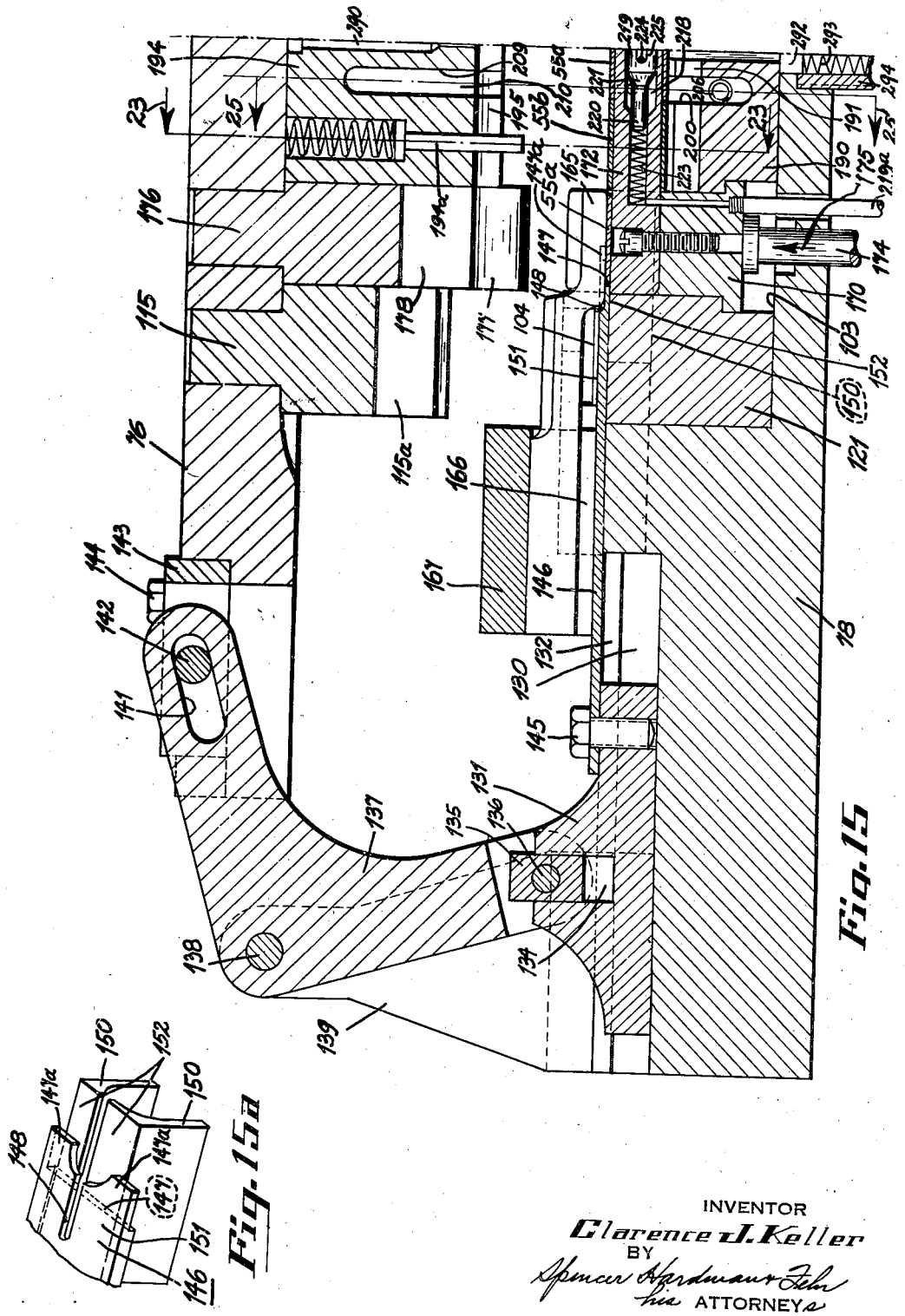
Figure 16:
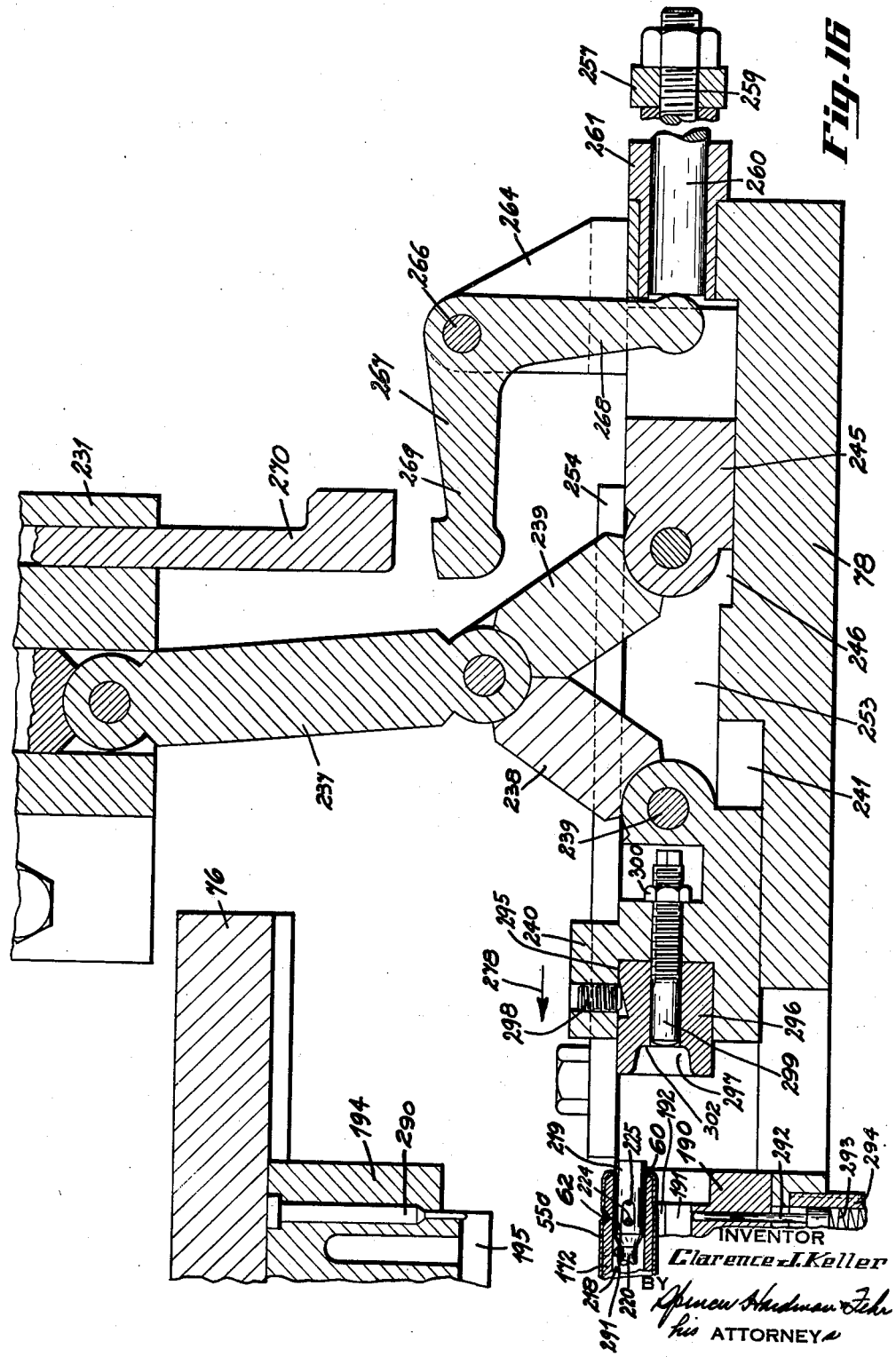

Figs. 15 and 16 together form a cross-sectional view similar to Figs. 13 and 14, showing, however, the parts carried by the upper die plate in inoperative position.

Fig. 15a is a fragmentary perspective view of a detail of the machine.

Figure 17:
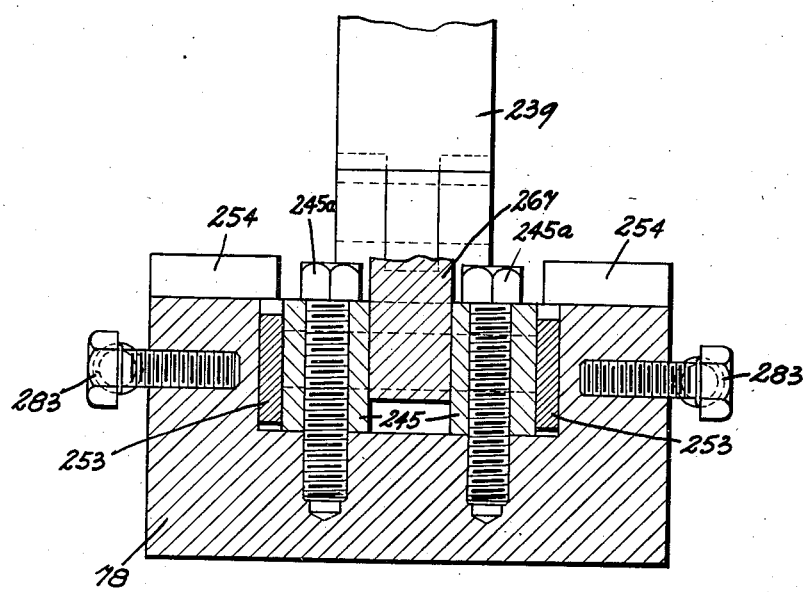

Fig. 17 is a sectional view taken on the line 17—17 of Fig. 7.

Figure 18:
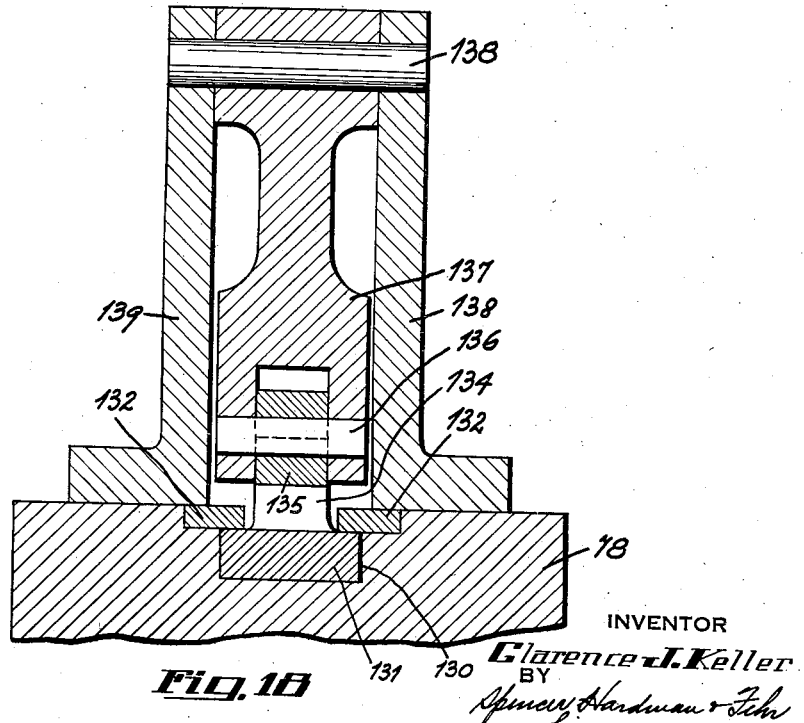

Fig. 18 is a sectional view taken on the line 18—18 of Fig. 13.

Fig. 19 is a sectional view taken on the line 19—19 of Fig. 6.

Fig. 20 is a sectional view similar to Fig. 19, showing however, the upper die plate in another position.

Figure 21:
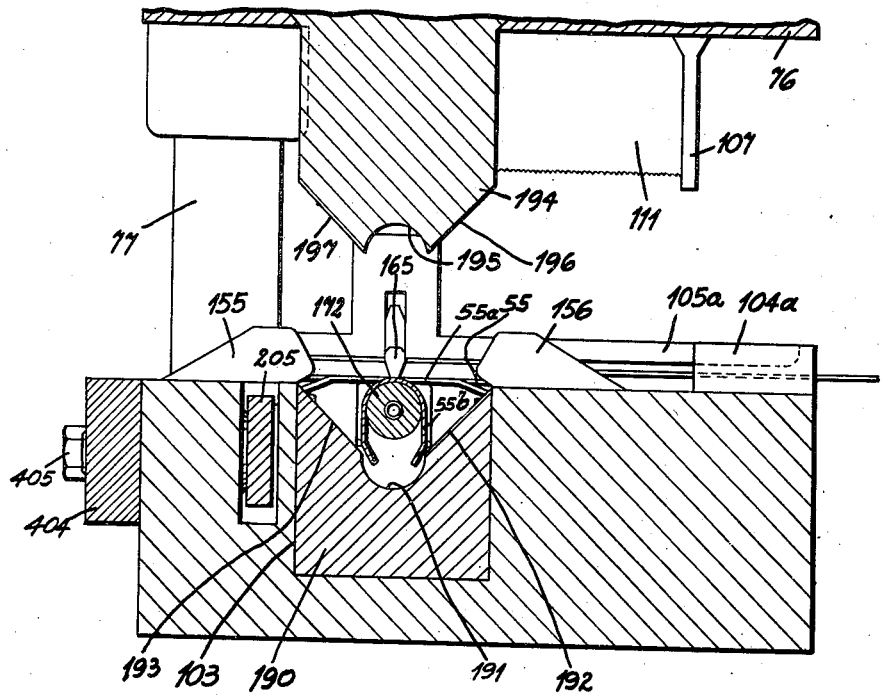

Fig. 21 is a sectional view taken on the line 21—21 of Fig. 7.

Figure 22:
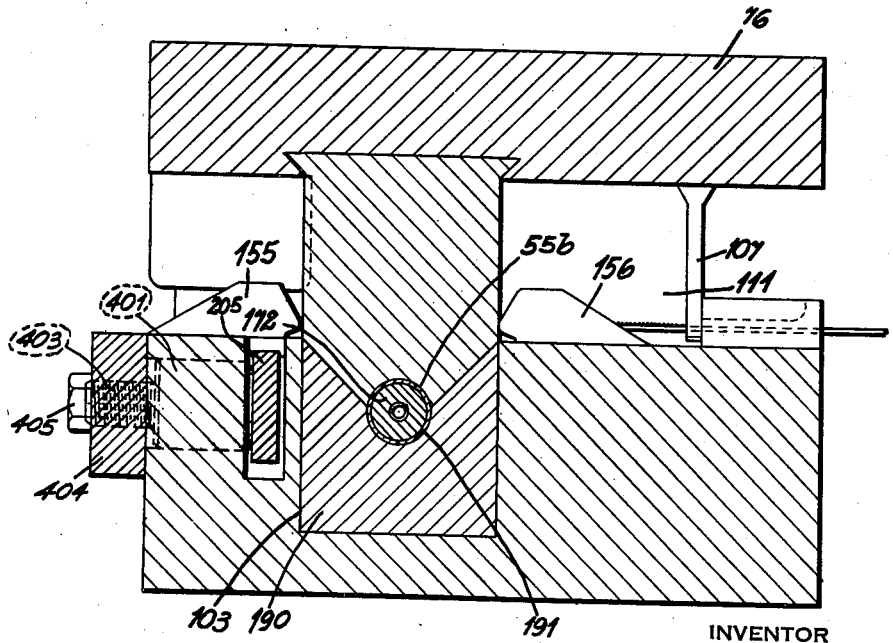

Fig. 22 is a sectional view similar to Fig. 21 showing, however, the upper die plate in another position.

Fig. 23 is a sectional view taken on the line 23—23 of Fig. 15.

Fig. 24 is a fragmentary sectional view showing a portion of Fig. 23 with the upper die in operative position.

Fig. 25 is a sectional view taken on the line 25—25 of Fig. 15.

Fig. 26 is a sectional view taken on the line 26—26 of Fig. 13.

Fig. 27 is an enlarged fragmentary sectional view taken substantially on the line 27—27 of Fig. 6, showing an article shortly before one end thereof is crimped inwardly.

Fig. 28 is a view similar to Fig. 27, showing, however, the end of the article crimped inwardly.

Figure 29:
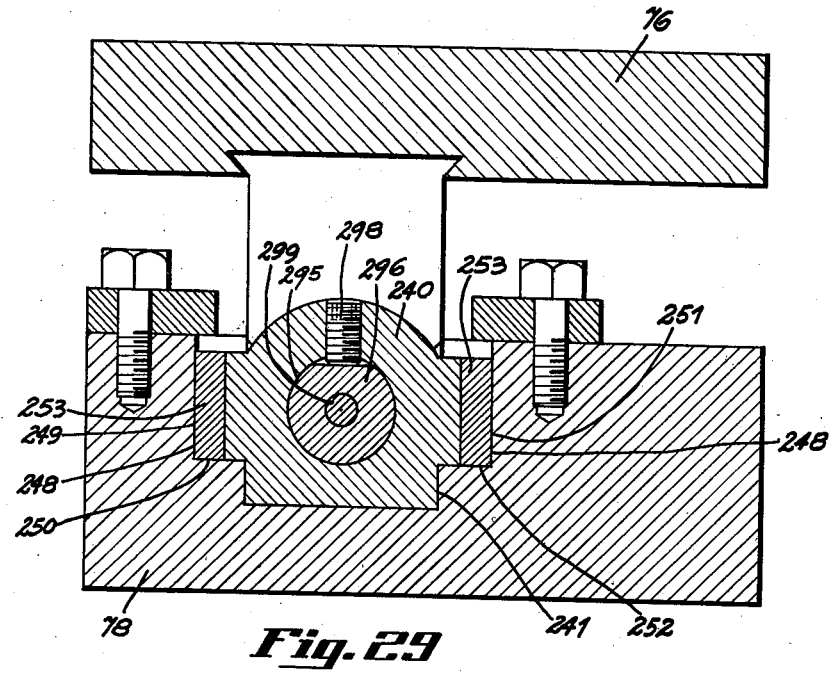

Fig. 29 is a sectional view taken on the line 29—29 of Figs. 7 and 14.

Figure 30:
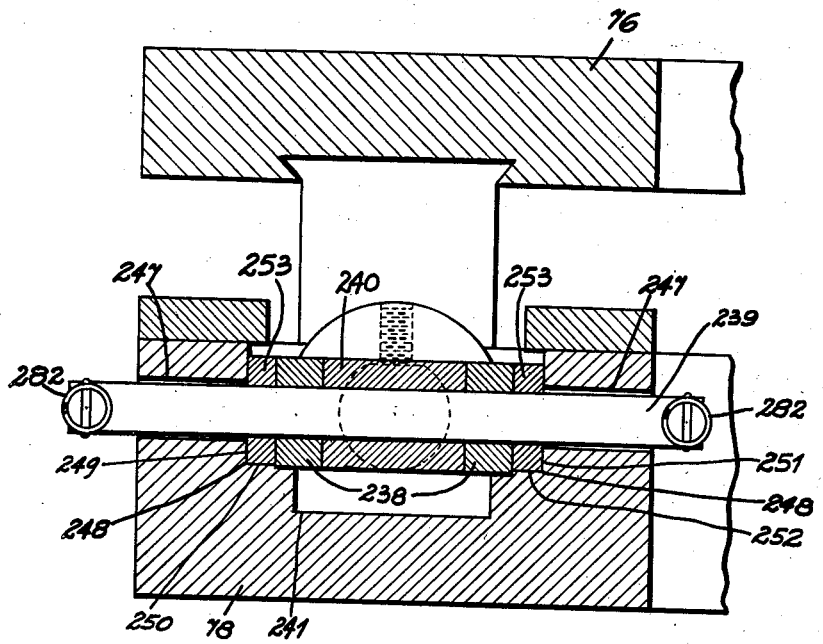

Fig. 30 is a sectional view taken on the line 30—30 of Figs. 7 and 14.

Figs. 31 and 32 are detail views of cams mounted on the cam shaft of the punch press.

Figure 33:
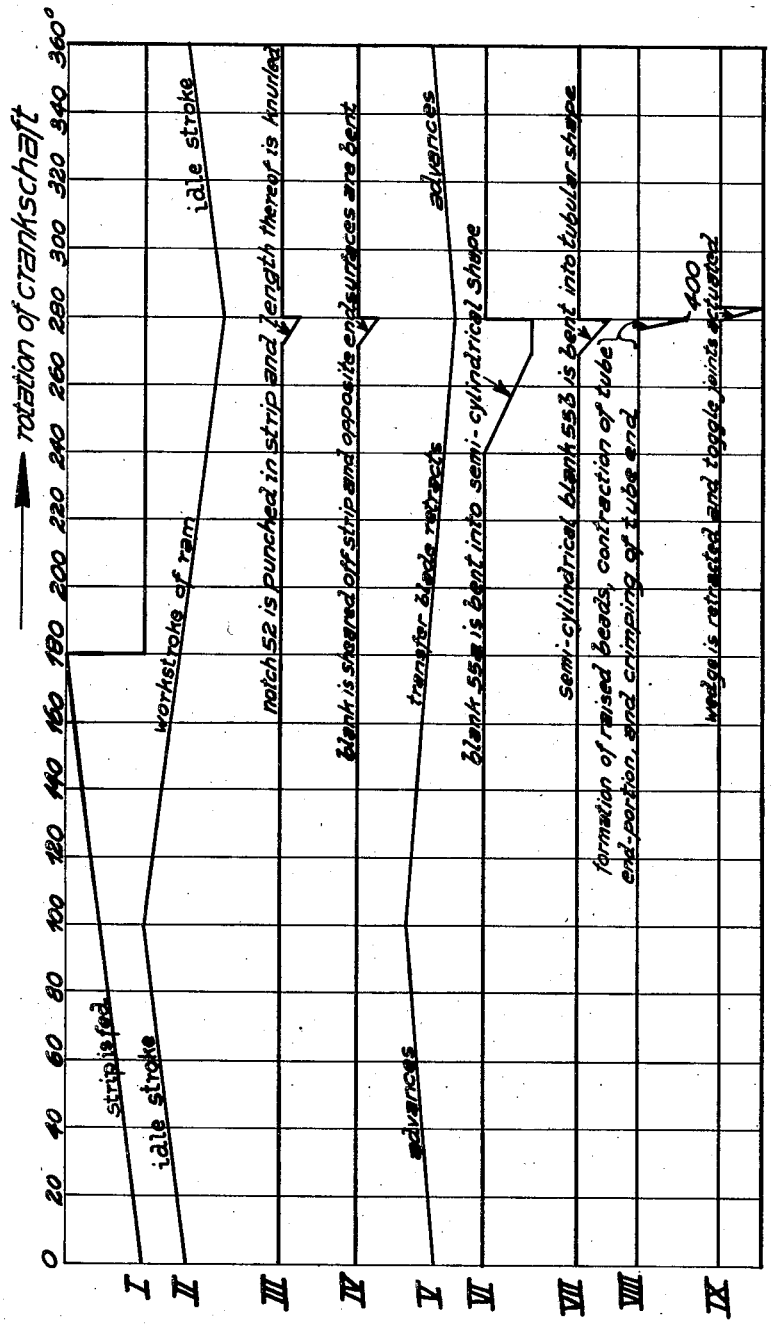

Fig. 33 is a chart illustrating the timed relationship between the operations of the various devices of the machine.

Figure 1:
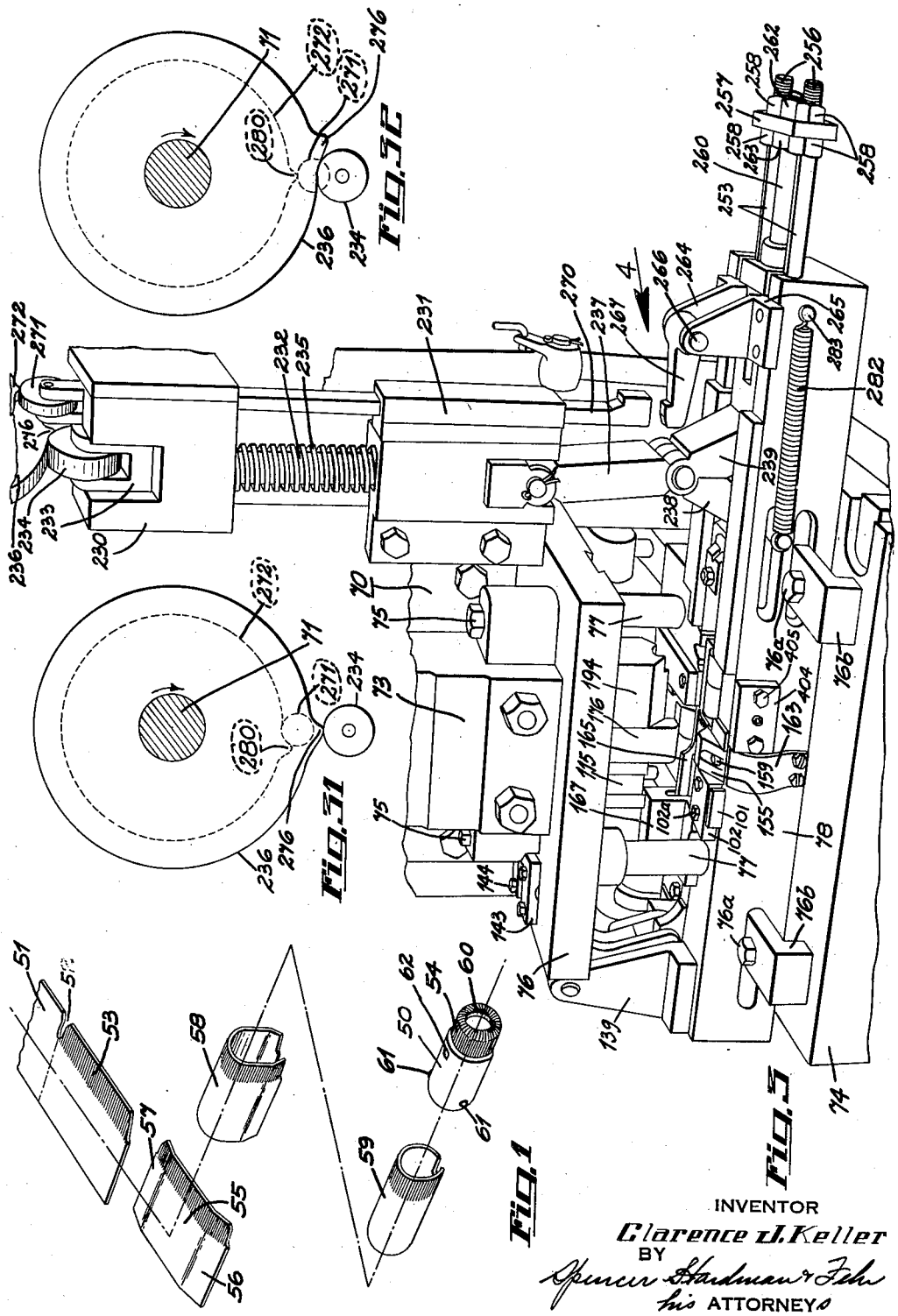
Fig. 1 illustrates progressive steps of the method for forming tubular articles from a strip of sheet material.

Referring to the drawings and particularly to Fig. 1, the present machine forms tubular articles such as the illustrated socket 50 from a supply strip 51 of sheet material in a manner to be explained presently. A notch 52 is first punched into the strip 51 so that the strip portion 53 between recesses 52 may be bent into the slightly reduced cylindrical shape 54. The portion 53 is then knurled, and a notched and knurled blank 55 is subsequently sheared off the strip 51 and the end surfaces 56 and 57 are slightly bent out of the main plane of the blank. The blank is next bent into the semi-cylindrical shape 58 and by a following operation into the tubular shape shown at 59. Thereafter the knurled tubular portion is reduced in diameter as shown at 54, an end portion thereof is crimped inwardly as shown at 60, and two raised beads 61 and one sunken bead 62 are finally formed in the periphery of the socket 50.

The present machine which successively shears blanks 55 from the strip 51 and then shapes them in successive order pursuant to the method illustrated in Fig. 1, consists of a conventional punch press frame 70 supporting a crankshaft 71, a clutch wheel 72, a one revolution clutch (not shown), which connects the power driven clutch wheel 72 with the crankshaft and is operated by mechanism to be described later, a ram 73 and a bolster plate 74. Attached to the ram 73 in any suitable manner such as by bolts 75 is an upper die plate 76, and attached to the bolster plate 74 by angle plates 76b and bolts 76a is a lower die plate 78. A plurality of pilots 77, carried in any suitable manner by the upper die plate 76, is received by corresponding bores in the lower die plate 78 and are adapted properly to guide the upper die plate toward and away from the lower die plate. The upper and lower die plates support devices which simultaneously perform operations resulting in the transfiguration of the strip 51 of sheet material into tubular articles 50 as illustrated in Fig. 1. These devices are a strip feeding device A, a punching and knurling device B, a shearing and first bending device C, a blank transfer device D, a second bending device E, a tube forming device F, and a contracting, crimping and bead forming device G, all of which will be detailedly described in the above mentioned order.

*Feeding device A*

Attached in any suitable manner to the parallel ribs 80 of the punch press frame 70 is a bracket 81, rotatably supporting a shaft 82 which extends through both ribs 80 of the punch press frame and has mounted thereon a feed roll 83, being provided with a gear 84, meshing with a gear 85 of another feed roll 86, mounted on a stub shaft 87, received by another bracket 88 which is movable vertically along guide screws 89, extending through brackets 81 and 88 and being surrounded at one end by compression springs 90, which by means of nuts 91, received by the threaded portions 92 of said screws, are maintained under compression and urge feed roll 86 into engagement with its companion feed roll 83. Attached to that end of shaft 82 which extends beyond one of the frame ribs 80 is a feed roll indexing device 93 of any suitable construction, preferably of the over running clutch type, which is actuated by a lengthwise adjustable link 94, connecting the indexing device with an eccentric disc 95, mounted in any suitable manner on crankshaft 71. The eccentric throw of disc 95 may be adjusted within certain limits in order to adjust the amount of angular movement of the feed rolls during feeding, by means of a radial groove 96 in disc 95 which receives a crank pin 97, connecting the crank disc 95 with the connecting link 94. This crank pin 97 may be moved into any position within groove 96 and secured in adjusted position by means of a screw 98, extending throughout groove 96 and being provided with a slotted head 99 to be manually rotated thereby. Crankpin 97, which is non-rotatable, is in threaded engagement with the screw 98. It is obvious that during one-half of each revolution of the crank shaft 71 the indexing device is active and the feed rolls 83 and 86, the latter by intermediation of gears 84 and 85, rotate and feed a strip 51 of sheet material in the direction of arrow 100 of Fig. 11 until the foremost edge thereof strikes against a stop 101 of hardened steel which is attached to lower die plate 78 by a coverplate 102 and a plurality of screws 102a as best shown in Figs. 4 and 11.

*Punching and knurling device B*

It can be observed in Figs. 8, 11 and 12, that the strip 51 of sheet material is fed on top of a steel block 104, received in a recess 105 of the lower die plate 78 and having an opening 106, adapted to receive a punch 107 which is received in a recess 108 of the upper die plate 76 and secured therein by a set screw 109. Upon movement of the upper die plate 76 into the position shown in Fig. 12, the punch 107 punches the notch 52 into the strip 51 as illustrated in Fig. 1. Also attached to the upper die plate 76 by screws 110 is a steel block 111, having a knurled surface 112, which upon movement of upper die plate 76 into the position shown in Fig. 12 impresses its knurled mark 112 into the strip 51 of sheet material as illustrated in Fig. 1. A guide plate 104a guides the strip in a linear direction over the top surface of block 104. This guide plate 104a has a groove 105a (see Fig. 6) providing clearance for the punch 107 and knurling block 111 when in the position shown in Fig. 12.

*Shearing and first bending device C*

Referring more particularly to Figs. 11 and 12, the upper die plate 76 also carries in any suitable manner a block 115 to which is attached by screws 116 a shear plate 117, having a shearing edge 118 and a bending surface 119 of the same taper and length as a bending surface 120, provided by block 115. Received in a rectangular recess 103 of the lower die plate 78 is a block 121, the top surface 122 of which is below the top surface 123 of block 104 so that the fed strip 51 of sheet material extends above the top surface 122 of block 121. Block 121 is provided with two bending surfaces 123 and 124 corresponding to the bending surfaces 119 and 120, respectively, of shear plate 117 and block 115, respectively. Block 104 is provided with a shearing edge 125 adapted to cooperate with the shearing edge 118 of shear plate 117. During movement of upper die plate 76 toward the position shown in Fig. 12, the shearing edges 118 and 125 of shear plate 117 and block 104, respectively, first cooperate and shear a blank 55 off the strip 51 of sheet materials and more particularly through the center of a notch 52 as best illustrated in Fig. 1. Upon continued movement of the upper die plate 76 into the position shown in Fig. 12, the corresponding bending surfaces 119, 123 and 120, 124 cooperate and bend the end surfaces 56 and 57 of blank 55 into the shape shown in cross section in Fig. 12.

*Blank transfer device D*

Referring to Figs. 5, 6, 11, 12, 13, 15, 15a and 18, the lower die plate 78 is provided with a guideway 130 within which is slidable a crosshead 131, held in the guide-way by two plates 132 and 133. This crosshead 131 has a transverse guide groove 134 in which is slidable a member 135, pivotally mounted as at 136 to one arm of a bell crank lever 137, rotatably mounted as at 138 on spaced bearing brackets 139 which, as shown in Fig. 6, are secured by screws 140 to the lower die plate 78. The other arm of bell crank lever 137 is provided with an oblong slot 141, receiving a pin 142, secured to a U-shaped member 143 which is attached to the upper die plate 76 by screws 144 as best shown in Figs. 13 and 15. Attached to crosshead 131 by a screw 145 is a transfer blade 146, one end of which is provided with a shoulder 147, two portions 147a overlapping said shoulder and a slot 148. Attached to the lower surface 149 of said transfer blade are two guiding and supporting blocks 150 whose cross section is shown in Fig. 11. It appears from that figure that the blocks 150 fit into correspondingly shaped aligned recesses provided by the block 121 and the lower die plate 78, thereby permitting longitudinal movement of blocks 150 but no lateral or rotative movement of the same relative to block 121 and lower die plate 78. It appears further from Fig. 11 that the bottom surface of the fed strip of sheet material is flush with the top surface 151 of transfer blade 146. At the time the previously described shearing and bending operation (see Fig. 12) takes place, the transfer blade 146 is in the position shown in Fig. 13, i. e. out of the path of movement of the blank 55 when the latter is moved from the position shown in Fig. 11 to that shown in Fig. 12. Upon movement of the upper die plate 76 from the position shown in Fig. 13 to that shown in Fig. 15, the transfer blade 146 is advanced from the position shown in Fig. 13 to that shown in Fig. 15 by intermediation of pin 142, bell crank lever 137, pin 136, member 135 and crosshead 131. During such advancing movement of transfer blade 146, the shoulder 147 thereof, which is now in alignment with the blank 55 lying on top of block 121 as illustrated in Fig. 12, will engage said blank and advance the same. During such advancing movement of the blank 55, the same is supported on the top surfaces 152 of the blocks 150 and the blade portions 147a overlap the blank as best shown in Fig. 15, whereby the end surfaces 56 and 57 of blank 55 are properly guided into the notches 153 and 154 of members 155 and 156, respectively, which as shown in Fig. 19, are slidable in rectangular grooves 157 and 158 respectively, of the lower die plate 78. The members 155 and 156 are held within said grooves 157 and 158 by screws 159 and 160, respectively, secured to the lower die plate 78, extending through oblong slots 161 and 162, respectively, of members 155 and 156, respectively, with their heads holding the members within the grooves. Leaf springs 163 and 164 attached to the lower die plate 78 in any suitable manner, urge the members 155 and 156, respectively, into the position shown in Fig. 19. While the blank 55 is advanced from the position shown in Fig. 13 to that shown in Fig. 15, it slides underneath a retainer member 165 which is pressfitted or otherwise secured in a notch 166 of a bracket 167 which, as shown in Fig. 5, is secured to the lower die plate 78 by a plurality of screws 168 and which performs a function that appears obvious later. The stationary retainer member 165 does not interfere with the advancing transfer blade 146 since the latter is provided with the earlier mentioned slot 148 which provides sufficient clearance for the retainer member 165 when in the extreme position shown in Fig. 15. In order that block 115 does not interfere with retainer member 165, the former is provided with a slot 115a (see Figs. 11, 13 and 15) for the reception of said retainer member when said block is in the position shown in Fig. 13. The supporting surfaces 152 of blocks 150 are flush with the top surface of block 121 (see Fig. 11) and it is therefore unnecessary that the transfer blade withdraw further than into the position shown in Fig. 13, wherein the blade itself is out of the path of movement of the blank 55 from the position shown in Fig. 11 to that shown in Fig. 12, but not the supporting surfaces 152 of blocks 150.

*Second bending device E*

Referring more particularly to Figs. 13, 15, 19 and 20, the blank 55 is shown in a position after the transfer by the transfer blade 146 from the position shown in Fig. 13 into the position 55a shown in Fig. 15, in which the blank is supported on its bent end surfaces 56 and 57 by the already described notched members 155 and 156. Substantially below these members 155 and 156 and received in recess 103 of lower die plate 78 is a rectangular block 170 having a longitudinal rib 171 forming a concave bed for the reception of a cylindrical arbor 172 which is secured to said bed by a screw 173. Block 170 is normally urged into the uppermost position shown in Figs. 15 and 19 in which the periphery of arbor 172 closest to the top surface of block 121 is flush therewith, by means of a plurality of pusher bars 174, which are urged in the direction of arrow 175 by springs (not shown). Attached to the upper die plate 76 in any suitable manner is a die member 176 having a semicircular groove 177, adapted to cooperate with the arbor 172 to bend the blank 55a into the shape shown in cross-section in Fig. 20 upon movement of the upper die plate 76 and die member 176 from the position shown in Fig. 19 to that shown in Fig. 20. Die member 176 is also provided with a slot 178 which, as best shown in Fig. 20, is adapted to receive retainer member 165, when said die member moves into the position shown in Fig. 20. Die member 176 and the members 155, 156 are provided with corresponding tapered surfaces 179, 180 and 181, 182 respectively, so that upon movement of die member 176 from the position shown in Fig. 19 to that shown in Fig. 20, these corresponding tapered surfaces cooperate and shift members 155 and 156 from the position shown in Fig. 19 into that shown in Fig. 20 in order to free the bent end surfaces 56 and 57 of blank 55a from the notched members 155 and 156 just when die member 176 clamps said blank 55a against the arbor 172 but before said blank is actually bent thereby. Upon movement of the upper die plate 76 from the position shown in Fig. 20 to that shown in Fig. 19 the floatingly supported block 170 returns into the position shown in Fig. 19 and thereafter the blank 55a which is now of substantially semi-circular shape is advanced into the position 55b (see Fig. 15) by a subsequently transferred blank 55 into position 55a.

Tube forming device F

Referring particularly to Figs. 13, 15, 21 and 22, the rectangular recess 103 in lower die plate 78 receives also a stationary die block 190, having a substantially semi-circular groove 191 merging into tapered surfaces 192 and 193 of said block. Carried by the upper die plate 76 in any suitable manner is a die block 194 having a substantially semi-circular groove 195, merging into tapered surfaces 196 and 197, which correspond with the tapered surfaces 192 and 193, respectively, of die block 190. The curved walls of the semi-circular grooves 195 and 177 of die members 194 and 176, respectively, are flush as shown in Figs. 13 and 15 due to the fact that the arbor 172 serves for the bending of a blank 55a into semi-cylindrical shape as well as for the bending of a semi-cylindrical blank 55b into tubular shape. Die block 194 carries a spring pressed plunger 194a which during movement of said die block toward the position shown in Figs. 22 and 24 clamps the semi-cylindrical blank 55b against the arbor before the die block 194 engages said blank. The spring urged pusher bars 174 exert such a force against block 170 that during movement of die member 176 from the position shown in Fig. 19 toward that shown in Fig. 20, the blank is bent into the semi-cylindrical shape while block 170 is in the position shown in Fig. 19. Thereafter block 170 is moved into the position shown in Fig. 20 by intermediation of the semi-circular groove 177 of die member 176, the semi-cylindrical blank and the arbor 172. From this follows that the semi-circular die surface of die member 194 engages the semi-cylindrical blank 55b at the moment when a blank 55a is completely bent into semi-cylindrical shape, and upon continued movement of die members 176 and 194 into the position shown in Figs. 20 and 22, the latter uniformly presses the semi-cylindrical blanks 55a and 55b against the arbor 172 whereupon blank 55b is bent into tubular shape (see Fig. 22). Upon movement of upper die plate 76 into the position shown in Figs. 19 and 21, block 170 and arbor 172 return into the position shown in Figs. 19 and 21, ready for the next transfer of a blank 55 into position 55a, whereby blank 55a is advanced into a position 55b, blank 55b is advanced into a position 55c along the arbor 172 and a tube 55c is ejected from the arbor as can be readily understood.

Contracting, crimping and bead forming device G

While the tube is in the position 55c, the same is provided with the beads 61 and 62, the contracted portion 54 and the inwardly crimped end portion 60 in form of a flange. Referring more particularly to Figs. 13 to 16 inclusive, and 25 to 28 inclusive, die block 190 is provided with a slot 200 in which is movable horizontally a die plate 203 within limits prescribed by a pin 201, secured to block 190 and extending through an oblong slot 202, provided by said die plate. This die plate 203 has a tapered surface 204 which corresponds with the tapered surface 197 of die block 194 and is urged into engagement with a wedge 205 by a compression spring 206 which is received in a recess 207 of block 190. Particulars of the wedge 205 will be described later, it being sufficient for the time being to mention that longitudinal movement of said wedge results in movement of die plate 203 into either one of the positions shown in Figs. 25 and 26. Die plate 203, when in the position shown in Fig. 26, is flush with the wall of the semi-circular groove 191 of die block 190 and is provided with a dent 208 adapted to serve as a die for one of the raised beads 61. Die block 194 is provided with a slot 209 of the same width and in alignment with slot 200 of die block 190. Received by the said slot 209 is a die plate 210 being movable horizontally within certain limits prescribed by a pin 211, secured to block 194 and extending through an oblong slot 212 of said die plate 210, which is normally urged to the right as viewed in Fig. 25 by a compression spring 213, which is received by an annular recess 214, provided by block 194. Die plate 210, when in the position shown in Fig. 26, has a surface 215 flush with the wall of semi-circular groove 195 of block 194 and is provided with a dent 216, adapted to act as a die for the formation of the other raised bead 61. Die plate 210 is furthermore provided with a tapered surface 217 corresponding with the tapered surface 192 of block 190. A portion of the arbor 172 is hollow as indicated at 218, and receives a cylindrical short bar 219, having a reduced portion 220 and a frusto-conical portion 221, connecting said reduced portion with the main portion of bar 219. A recess 222 of the arbor receives a compression spring 223 which bears against the reduced bar portion 220 and urges the bar into a position in which a pin 224, secured to the arbor and extending through an oblong slot 225 of bar 219, engages the left end wall of said slot 225. Slidable in radial holes 226 and 227 of arbor 172 are two bead forming punches 228 and 229, respectively, bearing against bar 219 and having convex points 230 and 231, respectively. Recess 222 communicates on the one hand with the hollow arbor portion 218 through a longitudinal groove 223a of the bar 219 and on the other hand with a duct 220a which in turn communicates with a pipe 219a or any other suitable conduit. Pipe 219a is in communication with any suitable vacuum pump (not shown) which creates a permanent vacuum in duct 220a and recess 222, drawing the bead forming punches 228 and 229 into normal position which is shown in Fig. 27. Upon movement of bar 219 from the position shown in Fig. 27 to that shown in Fig. 28 by means to be described later, the frusto-conical bar portion 221 forces the punches 228 and 229 into the position shown in Fig. 28, and during such movement of the punches the points 230 and 231 thereof force the cylindrical wall of tube 55c into the dents 208 and 216 of die plates 203 and 210, respectively, which at that time are in the position shown in Fig. 26. Die plate 210 is moved into the position shown in Fig. 26 upon movement of die block 194 into the position shown in Fig. 26 and through cooperation between the tapered surfaces 217 and 192 of die plate 210 and block 190, respectively, as can be readily understood. Upon movement of die block 194 from the position shown in Fig. 26 to that shown in Fig. 25, the arbor 172 follows said die block until it arrives in the position shown in Fig. 25, but the die plate 210 at once moves into the position shown in Fig. 25 and frees the raised bead from the dent 216.

Next the operation of the earlier mentioned wedge will be described which causes movement of die plate 203 into either one of the positions shown in Figs. 25 and 26. As best shown in Figs. 3, 7, 14 and 16, there are provided in any suitable manner on the punchpress frame two vertical guides 230 and 231, longitudinally slidably supporting a cylindrical bar 232 whose upper end is provided with a clevis 233, rotatably supporting an anti-friction roller 234 which is constantly urged into engagement with a cam 236 on crankshaft 71 by a compression spring 235, interposed between guide 231 and a shoulder (not shown) of bar 232. A link 237 connects the cylindrical bar 232 with toggle joints 238 and 239. Toggle joint 238 is connected by a pin 239 with a block 240 which is movable in a guideway 241 provided by the lower die plate 78. Toggle joint 239 is connected with a block 245 which is longitudinally adjustably mounted in a guideway 246 of the lower die plate 78 by means of screws 245a extending through oblong slots 245b of block 245 and received by the lower die plate. The pin 239 extends with both ends through oblong slots 247 which are provided by the lower die plate 78 as best shown in Figs. 7 and 30. Slidable longitudinally in grooves 248 (see Fig. 30), defined by the side surfaces of blocks 240 and 245 and the machined surfaces 249, 250 and 251, 252 of lower die plate 78, are flat bars 253 as best shown in Fig. 30. These bars 253 are retained within the grooves 248 by overlapping plates 254, which are secured to the top surface of lower die plate 78 by screws 255. Both of these flat bars 253 are connected adjacent their one end with the pin 239, and their other ends are threaded as indicated at 256 in Fig. 7 and receive a cross-bar 257 and nuts 258 which secure said flat bars to said cross bar. As best shown in Fig. 16, the cross bar 257 receives the threaded end 259 of a cylindrical bar 260 which is slidable longitudinally in a bushing 261, secured in any suitable manner to the lower die plate 78. Cross bar 257 is secured in adjusted position to the threaded bar portion 259 by nuts 262 and 263 on opposite sides of cross bar 257. Mounted on the top surface of lower die plate 78 are two spaced bearing brackets 264 and 265, supporting a stub shaft 266 which in turn rotatably supports a bell crank lever 267. It follows from Fig. 16 that one arm 268 of said bell crank lever is in alignment with the cylindrical bar 260, and the other arm 269 thereof is in alignment with a ram 270 which is guided for vertical movement in the guides 230 and 231 and carries at its uppermost end an anti-friction roller 271, which by means of a spring (not shown) is permanently urged into engagement with a cam 272 (see Fig. 3), mounted on the crank shaft 71. Connected to one of the flat bars 253 in the manner disclosed in Fig. 7a is the wedge 205, which, as best shown in Fig. 6, is provided with a tapered surface 273 leading to a narrower end portion 274 of said wedge. Die plate 203 has a tapered surface 275 (see Fig. 7) which is adapted to cooperate with the tapered surface 273 of the wedge in order to move said die plate from the position shown in Fig. 25 to that shown in Fig. 26. Opposite the die plate 203 the wedge 205 bears against a steel roll 401 which is received in a bore 402 of lower die plate 78 and held in longitudinally adjusted position by a set screw 403, received by a plate 404 which is secured to lower die plate 78 by screws 405. Such longitudinal adjustment of steel roll 78 serves for the accurate aligning of die plate 203 with the die groove 191 of die block 190. At the proper time the lobe 276 of cam 236 depresses bar 232, whereby block 240 is moved in the direction of arrow 278 by intermediation of the toggle joints 238, 239 and link 237. Movement of block 240 in the direction of arrow 278 results in movement of the bars 253 in the same direction by intermediation of pin 239, and during such movement the tapered surface 273 of wedge 205 is moved into cooperation with the tapered surface 275 of die plate 203 whereupon the latter is moved from the position shown in Fig. 25 to that shown in Fig. 26, in which position the surface 279 of die plate 203 is flush with the wall of the semi-cylindrical groove 191 of die block 190 and the dent 208 in that surface is in the proper position to serve as a die for the formation of one of the raised beads 61 in the periphery of tube 55c. Concurrent movement of the bead forming punches 228 and 229 into the position shown in Fig. 26 is caused by the movement of bar 219 from the position shown in Fig. 27 to that shown in Fig. 28. The means for moving bar 219 in such direction will be described later. At the proper time the lobe 280 of cam 272 depresses ram 270 which strikes against the arm 269 of bell crank lever 267, thereby rotating the same in counterclockwise direction as viewed in Fig. 14 whereby the arm 268 thereof moves bar 260 in the direction of arrow 281, the motion of which is imparted to wedge 205 by intermediation of crossbar 257 and one of the flat bars 253. Such movement of the wedge 205 results in the alignment of the narrower wedge portion 274 with the die plate 203, so that the latter is free to move into the position shown in Fig. 25 under the compression of spring 206. Movement of bar 260 in the direction of arrow 281 as viewed in Fig. 14 also results in a change of position of the toggle joints from that shown in Fig. 14 to that shown in Fig. 16 by intermediation of crossbar 257, flat bars 253, pin 239 and compression spring 235. Since the compression of spring 235 in conjunction with the tension of springs 282, which are connected with one end to pin 239 and with the other end to screws 283 secured to the lower die plate 78, may not always overcome the considerable static friction between die plate 203 and the wedge 205, when the latter is to be withdrawn from said die plate, the ram 270 and the described structure operated thereby is provided in order positively to retract the wedge from the die plate 203 and return the toggle joints 238, 239 from the position shown in Fig. 14 to that shown in Fig. 16.

For the formation of the sunken bead 62, die block 194 carries a punch 290, and the arbor 172 is provided with an axially aligned dent 291. Upon movement of die block 194 from the position shown in Figs. 21 or 25 to that shown in Figs. 22 or 26, punch 290 forces a portion of the cylindrical wall of tube 55c into the dent 291. Axially aligned with the punch 290 and received by the lower die plate 78 and die block 190 is a plunger 292, which is normally urged against the arbor 172 by a spring 293, which is received by a tubular member 294, attached to the lower die plate 78 in any suitable manner. This plunger 292 serves as a yielding support for the comparatively long arbor 172, only one end of which is supported by the block 170 as can be best seen in Figs. 15 and 16.

For the purpose of reducing the knurled portion of tube 55c by contraction of the notched cylindrical end portion of tube 55c (see Fig. 27), block 240 is provided with an annular recess 295 in which is received a die member 296, provided with a recess 297 having a tapered recess wall. Die member 296 is secured within recess 295 by a set screw 298. Threaded into block 240 and extending with one end adjacent the bottom of recess 296 is a hardened bolt 299 which is locked in the position shown in Fig. 16 by a nut 300. While the arbor 172 is in the position shown in Figs. 13 and 14, the toggle joints 238 and 239 are moved from the position shown in Fig. 16 to that shown in Fig. 14 in the earlier described manner, and during such movement of the toggle joints, block 240 and die member 295 advance toward said arbor whereby the tapered wall of recess 297 forces the knurled portion 54 of tube 55c into engagement with the diametrically reduced end portion 301 of the arbor 172, and immediately thereafter the end of said knurled tube portion 54 which is extending beyond the reduced arbor portion 301 is crimped inwardly by the bottom 302 of recess 296. After the reduction of the knurled tube end portion 54, the opposite parallel walls of the notch 52 thereof are abutting each other as can be readily understood from Figs. 27 and 28. It follows further from Figs. 27 and 28 that during the crimping of the end of the knurled tube portion 54, the bolt 299 moves bar 219 from the position shown in Fig. 27 to that shown in Fig. 28, thereby causing the formation of the raised beads 61 in the earlier described manner.

Mode of operation

The operation of the machine will now be described with reference to the chart shown in Fig. 33, wherein the various operations performed by the machine are shown in dependency upon one complete revolution of the crank shaft 71. It follows from tier I of the chart that the strip of sheet material is fed in the earlier explained manner during 180° rotation of crank shaft 71. After approximately 100° rotation of the crank shaft from the start of the feeding operation, the ram 73 starts on its work stroke, which as shown in tier II is completed after 180° further rotation of the crank shaft 71. Toward the end of the work stroke of the ram various operations take place all of which are represented graphically in the chart. Tier III represents the simultaneous punching of the notch 52 into the strip 51 of sheet material and the knurling of a preassigned length of said strip. During the latter part of the work stroke of the ram, a blank 55 is sheared off the supply strip 51 and immediately thereafter opposite end surfaces 56 and 57 thereof are slightly bent out of the main plane of the blank 55 as represented by tier IV in the chart. Between work strokes and more particularly during an idle stroke of the ram, the slightly bent blank 55 is moved toward the arbor 172 into the position 55a by transfer blade 146 in the earlier described manner as represented by tier V. It follows from tier V of the chart that the transfer blade retracts concurrently with the movement of the ram on its work stroke, and advances concurrently with the movement of the ram on its idle stroke. During a considerable part of the work stroke of the ram 73 as illustrated in tier VI of the chart, the blank 55a is bent into semi-cylindrical shape in the earlier explained manner. Comparison between tiers VI and VII of the chart shows that immediately after blank 55a has been bent into semi-cylindrical shape, another semi-cylindrical blank 55b is formed into tubular shape in the earlier explained manner. At the very end of the work stroke of ram 73, i. e. while the die blocks on upper die plate 76 retain the arbor 172 in the position shown in Figs. 13 and 14, the knurled tube end portion 54 is reduced in diameter in the earlier explained manner. Immediately thereafter the end of said knurled tube portion 54 is crimped inwardly and simultaneously therewith the raised beads 61 are formed in the earlier explained manner. The three last mentioned operations are represented in one tier VIII of the chart in a manner consistent with the foregoing explanations, as can be readily detected from the fact that the point 400 in the chart, which represents the time interval during which the three last mentioned operations take place, is illustrated as concurrent with the graphical representation of a completed workstroke of the ram and the end of the various bending operations. Tier IX of the chart shows that before the ram 73 and upper die place 76 appreciably retract from the lowermost position shown in Figs. 13 and 14, the wedge 205 is retracted and the toggle joints 238, 239 are actuated simultaneously in the earlier explained manner so as to free the tube 55c on the arbor 172 from any obstruction such as the dent 208 of die plate 203 and recess 297 of die block 296 which, when in the position shown in Figs. 14 and 26, would obstruct movement of tube 55c and arbor 172 into the position shown in Figs. 15 and 16. The sunken bead 62 is formed in the earlier explained manner during the very last part of the work stroke of the ram.

Figure 2:
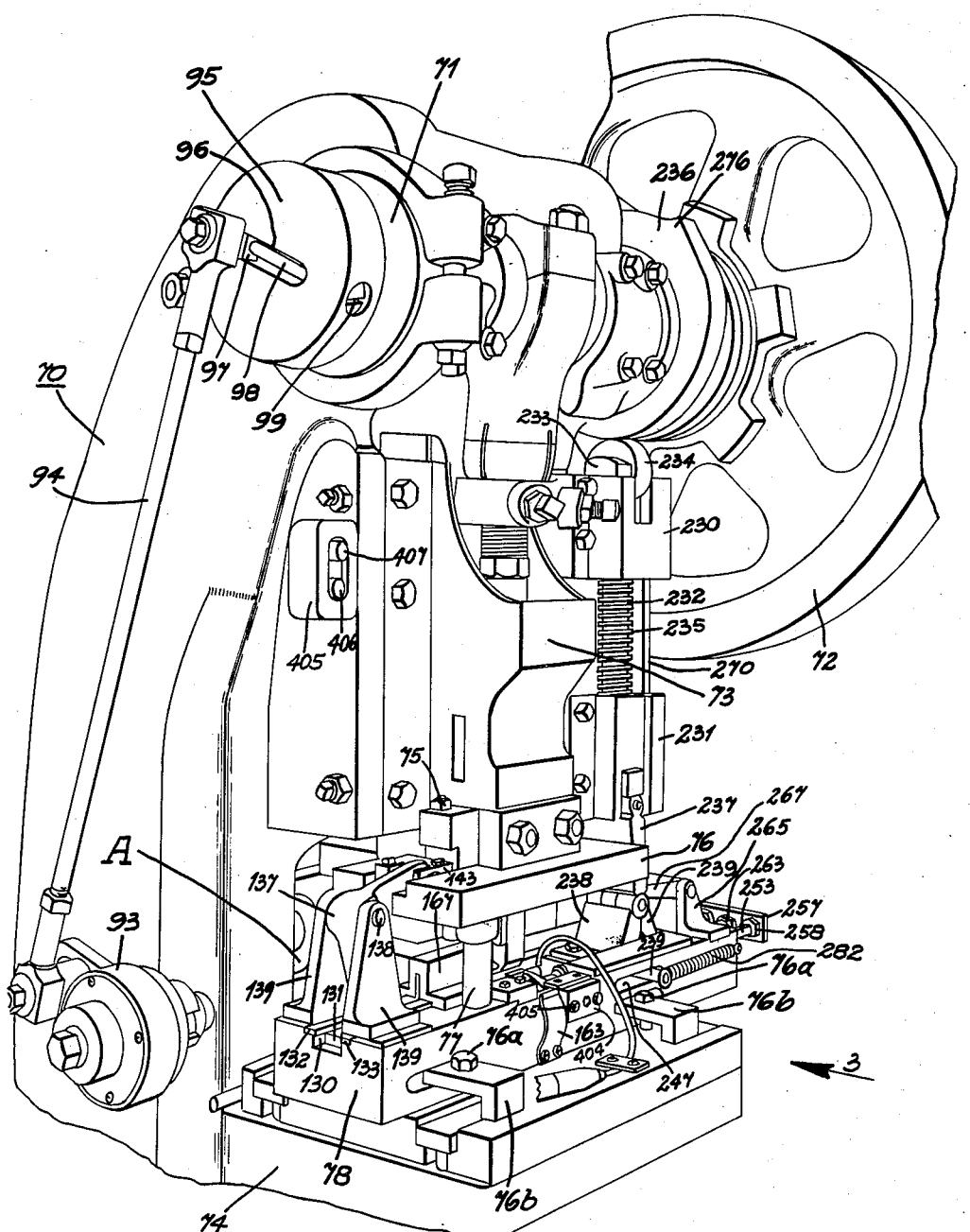
Fig. 2 is a fragmentary perspective view of a machine embodying the present invention.

It follows from the foregoing description that the entire machine is of the continumatic type, and the one revolution clutch which drivingly connects the power driven clutch wheel 72 with the crank shaft 71 is in any suitable manner forced permanently to transmit motion from the clutch wheel 72 to the crank shaft 71. This is preferably accomplished by an operator who keeps his foot all the time on any conventional foot operated clutch actuating mechanism, which only upon release by the foot of the operator automatically causes disengagement of the one-revolution clutch at the end of a started revolution of the crank shaft 71. A switch box 405 is attached in any suitable manner to the punch press frame 70 (see Fig 2), having buttons 406 and 407 for starting or stopping an electric motor (not shown) which drives the clutch wheel 72.

While the form of embodiment of the present invention as herein disclosed, constitutes a preferred form, it is to be understood that other forms might be adopted, all coming within the scope of the claims which follow.

What is claimed is as follows:

1. Apparatus of the character described comprising, in combination, means for severing blanks from a strip of material; means for intermittently feeding the strip to the severing means; means for pre-forming a portion of a blank into part-tubular shape; means for forming the pre-formed blank into tubular shape; and means for transferring a blank successively from the severing means to the pre-forming means and then to the forming means.

2. Apparatus of the character described comprising, in combination, means for severing blanks from a strip of material; means for intermittently feeding the strip to the severing means; means located at the blank severing station for bending two opposite end portions of a blank out of the plane thereof; means for pre-forming a portion of a blank intermediate the bent end portions thereof into part tubular shape; means for forming the pre-formed blank into tubular shape; and means for transferring a blank successively from the severing and bending station to the pre-forming means and then to the forming means.

3. Apparatus of the character described comprising, in combination, means for severing blanks from a strip of material; means for intermittently feeding the strip to the severing means; means for pre-forming a portion of a blank into part tubular shape; means for forming the pre-formed blank into tubular shape; means for crimping a tube end portion to provide a flange extending transversely of the tube axis; and means for transferring a blank successively from the severing means to the pre-forming means, then to the forming means and finally to the crimping means.

4. Apparatus of the character described comprising, in combination, means for severing blanks from a strip of material; means for intermittently feeding the strip to the severing means; means for pre-forming a portion of a blank into part tubular shape; means for forming the pre-formed blank into tubular shape; means for forming a bead in the tube wall; and means for transferring a blank successively from the bending means to the pre-forming means, then to the forming means and finally to the bead-forming means.

5. Apparatus of the character described comprising, in combination, means for severing slotted blanks from a strip of material having equally spaced slots; means for intermittently feeding the strip to the severing means; means for pre-forming a portion of a blank into part tubular shape; means for forming the pre-formed blank into tubular shape; means for contracting the slotted tube portion to reduce the same; and means for transferring a blank successively from the severing means to the pre-forming means, then to the forming means and finally to the contracting means.

6. Apparatus of the character described comprising, in combination, means for pre-bending two opposite end portions of a blank out of the plane thereof; an arbor; members cooperating with the arbor for bending the pre-bent blank around the arbor to obtain a tubular shape; and means for transferring a blank on the arbor from the pre-bending means adjacent the members.

7. Apparatus of the character described comprising, in combination, means for severing a blank from a strip of material; means for pre-bending two opposite end portions of the blank out of the plane thereof; an arbor; members cooperating with the arbor for bending the pre-bent blank around the arbor into tubular shape; and means for transferring a blank on the arbor from the pre-bending means adjacent the members.

8. Apparatus of the character described comprising, in combination, a stationary and a cooperating movable member for pre-bending two opposite end portions of a blank out of the plane thereof; an arbor; and a stationary and a plurality of movable members, all cooperating with the arbor for bending first a blank portion intermediate said bent end portions partly around the arbor and then the remaining portions of the blank.

9. Apparatus of the character described comprising, in combination, a stationary and a cooperating movable member for pre-bending two opposite end portions of a blank out of the plane thereof; an arbor; a stationary and a plurality of movable members, all cooperating with the arbor first to bend a blank portion intermediate said bent end portions partly around the arbor and then the remaining portions of the blank; and means for moving all movable members in unison.

10. Apparatus of the character described comprising, in combination, a stationary and a cooperating movable member for pre-bending two opposite end portions of a blank out of the plane thereof; an arbor; a movable member cooperating with the arbor for bending the pre-bent blank partly around the arbor; and a stationary and a second movable member cooperating with the arbor for bending the partly bent blank completely around the arbor.

11. Apparatus of the character described comprising, in combination, a stationary and a cooperating movable member for severing a blank from a strip of material; a stationary and a cooperating movable member for pre-bending two opposite end portions of a blank out of the plane thereof; an arbor; a stationary and a plurality of movable members all cooperating with the arbor for bending first the pre-bent blank partly around the arbor and then the remaining portions of the blank; and means for moving all movable members in unison.

12. Apparatus of the character described comprising, in combination, a movable member for knurling a strip of material; means for severing knurled blanks from the strip; an arbor; a stationary and a plurality of movable members, all cooperating with the arbor for bending a blank therearound into tubular shape; and means for moving all movable members in unison.

13. Apparatus of the character described comprising, in combination, a movable and a cooperating stationary member for slotting a strip of material at equal distances; means for severing slotted blanks from the strip; an arbor; a stationary and a plurality of movable members, all cooperating with the arbor for bending a blank therearound into tubular shape; and means for moving all movable members in unison.

14. Apparatus of the character described comprising, in combination, an arbor having a reduced portion; a stationary and a plurality of movable members all cooperating with the arbor for bending a slotted blank therearound into tubular shape; means for moving all movable members in unison; and a member cooperating with the arbor and moved in timed relation with the unitary movement of the movable members for contracting a slotted tube portion into engagement with the reduced arbor portion.

15. Apparatus of the character described comprising, in combination, an arbor; a stationary and a plurality of movable members all cooperating with the arbor for bending a blank therearound into tubular shape; means for moving all movable members in unison; and a member cooperating with the arbor and moved in timed relation with the unitary movement of the movable members for crimping a tube end portion to provide a flange extending transversely of the tube axis.

16. Apparatus of the character described comprising, in combination, an arbor having a reduced portion; a stationary and a plurality of movable members all cooperating with the arbor for bending a slotted blank therearound into tubular shape; means for moving all movable members in unison; and a member cooperating with the arbor and moved in timed relation with the unitary movement of the movable members for contracting a slotted tube portion into engagement with the reduced arbor portion and for crimping a tube end portion to provide a flange extending transversely of the tube axis.

17. Apparatus of the character described comprising, in combination; an arbor having a die surface; a stationary and a plurality of movable members all cooperating with the arbor for bending a blank therearound into tubular shape; a movable member cooperating with the die surface of the arbor for forming a bead in the tube wall; and means for moving all movable members in unison.

18. In an apparatus of the character described, the combination of means including a single movable element for severing a blank from a strip of material and for bending two opposite end portions of a blank out of the plane thereof; and means for forming the bent blank into a tubular shape.

19. In an apparatus of the character described, the combination of means including a single movable element for severing a blank from a strip of material and for bending two opposite end portions of a blank out of the plane thereof; a track for guiding the strip to the severing and bending means; a stop; means for intermittently feeding the strip into engagement with the stop for a severing and bending operation; and a die movable in unison with the element for knurling a strip portion on the track.

20. In an apparatus of the character described, the combination of means including a single movable element for severing a blank from a strip of material and for bending two opposite end portions of a blank out of the plane thereof: a track for guiding the strip to the severing and bending means; a stop; means for intermittently feeding the strip into engagement with the stop for a severing and bending operation; and a punch movable in unison with the element and cooperating with the track for cutting a slot in one side of the strip.

21. Apparatus of the character described comprising, in combination, means for slotting one side of a strip of material at equal distances, each of said slots having two substantially parallel walls merging into flared walls which terminate at said one side of the strip; means for shearing the strip across the side edges thereof and through the notches to obtain blanks each having two complementary slot portions; means for forming a blank into tubular shape such that the two slot portions form together a complete slot in a tube end portion; means for contracting the slotted tube end portion until the parallel walls of the slot abut each other; and means for crimping the remaining slotted portion of the contracted tube end portion inwardly until the flared walls of the slot abut each other.

22. In an apparatus of the character described, the combination of means for severing blanks from a strip of material; means located at the severing station for supporting a severed blank; means for intermittently feeding the strip to the severing means; an arbor abutting the blank supporting means and being flush therewith, said arbor extending transversely of the feeding direction of the strip; a bar reciprocable parallel to the arbor for engaging an edge of a supported blank and transferring the same upon the arbor; and means cooperating with the arbor for bending said blank therearound into tubular shape.

23. In an apparatus of the character described, the combination of means for severing blanks from a strip of material; means located at the severing station for supporting a severed blank; means for intermittently feeding the strip to the severing means; an arbor abutting the blank supporting means and being flush therewith, said arbor extending transversely of the feeding direction of the strip; a bar reciprocable parallel to the arbor for engaging an end edge of a supported blank and transferring the same upon the arbor; two tracks movable transversely of the arbor and normally yieldingly urged into a position in which two opposite side portions of a blank being transferred move upon the track whereby said blank is maintained on the arbor; means including unitary movable members for bending the blank around the arbor into tubular shape; and means responsive to unitary movement of the members for withdrawing the tracks from the blank immediately before a bending operation.

24. In an apparatus of the character described, the combination of means for severing blanks from a strip of material; means located at the severing station for supporting a severed blank; means for intermittently feeding the strip to the severing means; an arbor abutting the blank supporting means and being flush therewith, said arbor extending transversely of the feeding direction of the strip; a bar reciprocable parallel to the arbor for engaging an end edge of a supported blank and transferring the same upon the arbor; two tracks movable transversely of the arbor and normally yieldingly urged into a position in which two opposite side portions of a blank being transferred move upon the tracks whereby said blank is maintained on the arbor, said tracks having camming surfaces; means including a movable member for partly bending the blank around the arbor, said member having camming surfaces cooperating with those of the tracks for withdrawing the same from the blank immediately before a bending operation; and means for completely bending said blank around the arbor into tubular shape.

25. In an apparatus of the character described, the combination of a floating arbor; a movable member cooperating with the arbor for bending a blank partly therearound; and a stationary and a second movable member, both cooperating with the arbor for bending the partly bent blank completely around the arbor, said second movable member moving the arbor into cooperation with the stationary member.

26. In an apparatus of the character described, the combination of a floating arbor; a movable member cooperating with the arbor for bending a blank partly therearound; a stationary and a second movable member; both cooperating with the arbor for bending the partly bent blank completely around the arbor, said second movable member moving the arbor into cooperation with the stationary member; and means for concurrently moving the movable members.

27. In an apparatus of the character described, the combination of means supporting a blank; a floating arbor abutting the supporting means and being normally flush therewith; means for transferring a blank from the supporting means upon the arbor; and a plurality of members, part thereof being movable and all cooperating with the arbor for bending the transferred blank therearound.

28. In an apparatus of the character described, the combination of a support for a blank; a floating arbor abutting the support and being normally flush therewith; a stationary member spaced from the arbor in normal position and a plurality of movable members, all cooperating with the arbor for bending a blank therearound into tubular shape, one of said movable members having camming surfaces; means for transferring a blank from the support upon the arbor for a bending operation; and two tracks movable transversely of the arbor and normally yieldingly urged into a position in which two opposite side portions of a blank being transferred move upon the tracks whereby said blank is maintained on the arbor, said tracks having camming surfaces cooperating with those of the referred to movable member for withdrawing the tracks from said blank prior to a bending operation.

29. In an apparatus of the character described, the combination of an arbor supporting a slotted tube, said arbor having a reduced portion; means for contracting the slotted tube portion into engagement with the reduced arbor portion; and means for clamping the tube to the arbor during the contracting operation.

30. In an apparatus of the character described, the combination of an arbor around which a blank is bent into tubular shape, said arbor having a reduced portion and a portion of said blank being slotted; means for contracting the slotted tube portion into engagement with the reduced arbor portion; and means for clamping the tube to the arbor during the contracting operation.

31. In an apparatus of the character described, the combination of an arbor supporting a tube having a slotted end portion; means for crimping said tube end portion to provide a flange extending transversely of the tube axis; and means for clamping the tube against the arbor during the crimping operation.

32. In an apparatus of the character described, the combination of an arbor supporting a tube; means for forming a bead in the wall of the tube on the arbor; and means for clamping the tube against the arbor during the bead forming operation.

33. In an apparatus of the character described, the combination of an arbor supporting a tube having a slotted end and said arbor having a reduced end; and a member reciprocable coaxially of the arbor for contracting the slotted tube end into engagement with the reduced arbor.

34. In an apparatus of the character described, the combination of an arbor supporting a tube having a slotted end; and a member reciprocable coaxially of the arbor for crimping the slotted tube end inwardly to provide a flange.

35. In an apparatus of the character described, the combination of an arbor supporting a tube having a slotted end and said arbor having a reduced end; and a member reciprocable coaxially of the arbor for contracting the slotted tube end into engagement with the reduced arbor portion and for crimping an end portion of the contracted tube portion inwardly to provide a flange.

36. In an apparatus of the character described, the combination of an arbor having a reduced end; means including unitary movable members for forming a blank having a slotted end around the arbor into tubular shape; and a member reciprocated coaxially of the arbor in timed relation with unitary movement of the members for contracting the slotted tube end into engagement with the reduced arbor end.

37. In an apparatus of the character described, the combination of an arbor; means including unitary movable members for forming a blank having a slotted end around the arbor into tubular shape; and a member reciprocated coaxially of the arbor in timed relation with unitary movement of the members for crimping the slotted tube end inwardly to provide a flange.

38. In an apparatus of the character described, the combination of an arbor having a reduced end; means including unitary movable members for forming a blank having a slotted end around the arbor into tubular shape; and a member reciprocated coaxially of the arbor in timed relation with unitary movement of the members for contracting the slotted tube end into engagement with the reduced arbor end, and for crimping an end portion of the contracted tube end inwardly to provide a flange.

39. In an apparatus of the character described, the combination of a support for a blank having a slotted end; a floating arbor abutting the support and normally flush therewith, said arbor having a reduced end; means for transferring a blank from the support upon the arbor; means including a stationary die member spaced from the arbor in normal position for bending the blank on the arbor therearound into tubular shape; and a member movable parallel to the arbor for contracting the slotted tube end into engagement with the reduced arbor end while the formed tube is in engagement with said stationary die member.

40. In an apparatus of the character described, the combination of a support for a blank having a slotted end portion; a floating arbor abutting the support and normally flush therewith; means for transferring a blank from the support upon the arbor; means including a stationary die member spaced from the arbor in normal position for bending the blank on the arbor therearound into tubular shape; and a member movable parallel to the arbor for crimping the slotted tube end inwardly to provide a flange while the formed tube is in engagement with said stationary die member.

41. In an apparatus of the character described, the combination of a support for a blank having a slotted end portion; a floating arbor abutting the support and normally flush therewith; means for transferring a blank from the support upon the arbor; means including a stationary die member spaced from the arbor in normal position for bending the blank on the arbor therearound into tubular shape; and a member movable parallel to the arbor for contracting the slotted tube end into engagement with the reduced arbor end and for crimping an end portion of the contracted tube portion inwardly to provide a flange.

42. In an apparatus of the character described, the combination of an arbor for supporting a tube; a punch movably supported by the arbor; an external die member adapted to cooperate with the punch for forming an external raised bead in the tube wall; and means for moving the punch in order to force a portion of the tube wall into engagement with the die member.

43. In an apparatus of the character described, the combination of an arbor for supporting a tube, said arbor having a hollow portion; a punch movable in the cylindrical wall of the hollow arbor portion; an external die member adapted to cooperate with the punch for forming an external raised bead in the tube wall; and a bar movable in the hollow tube portion and having a camming surface for moving the punch outwardly so as to force a portion of the tube wall into engagement with the die member.

44. In an apparatus of the character described, the combination of an arbor for supporting a tube, said arbor having a hollow portion; a punch movable in the cylindrical wall of the hollow arbor portion; an external die member adapted to cooperate with the punch for forming an external raised bead in the tube wall; a bar movable in the hollow tube portion and having a camming surface for moving the punch outwardly so as to force a portion of the tube wall into engagement with the die member; and a spring normally urging the bar out of camming engagement with the punch.

45. In an apparatus of the character described, the combination of an arbor for supporting a tube, said arbor having a hollow portion; a punch movable in the cylindrical wall of the hollow arbor portion; an external die member adapted to cooperate with the punch for forming an external raised bead in the tube wall; a bar movable in the hollow tube portion and having a camming surface for moving the punch outwardly so as to force a portion of the tube wall into engagement with the die member, said bar together with the hollow arbor portion forming a chamber inside the arbor; and means creating a permanent vacuum in said chamber for normally drawing the punch toward the arbor axis.

46. In an apparatus of the character described, the combination of an arbor for supporting a tube, said arbor having a hollow portion; a punch movable in the cylindrical wall of the hollow arbor portion; an external die member adapted to cooperate with the punch for forming an external raised bead in the tube wall; a bar movable in the hollow tube portion and having a camming surface for moving the punch outwardly so as to force a portion of the tube wall into engagement with the die member, said bar together with the hollow arbor portion forming a chamber inside the arbor; a spring normally urging the bar out of camming engagement with the punch; and means creating a permanent vacuum in said chamber for normally drawing the punch toward the arbor axis.

47. In an apparatus of the character described, the combination of an arbor for supporting a tube, said arbor having a hollow portion; a punch movable in the cylindrical wall of the hollow arbor portion; a stationary and a movable member forming together when engaged a semi-cylindrical wall against which bears the outer periphery of the tube in the arbor, said movable member being provided with a die surface in alignment with the punch; means for moving the movable member into engagement with the stationary member; and means for moving the punch outwardly so as to force a tube wall portion into engagement with the die surface.

48. In an apparatus of the character described, the combination of an arbor for supporting a tube, said arbor having a hollow portion; a punch movable in the cylindrical wall of the hollow arbor portion; a stationary and a movable member forming together when engaged a semi-cylindrical wall against which bears the outer periphery of the tube on the arbor, said movable member being provided with a die surface in alignment with the punch; and being normally yieldingly moved out of engagement with the stationary member; a movable wedge cooperating with the movable member for moving the latter into engagement with the stationary member; and means for moving the punch outwardly so as to force a tube wall portion into engagement with the die surface.

49. In an apparatus of the character described, the combination of an arbor having a hollow portion; means including unitary movable members for forming a blank around the arbor into tubular shape; a punch movable in the cylindrical wall of the hollow arbor portion; a stationary and a movable member forming together when engaged a semi-cylindrical wall against which bears the outer periphery of the tube on the arbor, said movable member being provided with a die surface in alignment with the punch and being normally yieldingly moved out of engagement with the stationary member; a wedge moved in timed relation with unitary movement of the first mentioned members and cooperating with the movable member for moving the latter into engagement with the stationary member; and means for moving the punch outwardly so as to force a tube wall portion into engagement with the die surface.

50. In an apparatus of the character described, the combination of an arbor for supporting a tube having a slotted end portion, said arbor having a hollow portion and a reduced end; a punch movable in the cylindrical wall of the hollow arbor portion; an external die member adapted to cooperate with the punch for forming an external raised bead in the tube wall; a bar movable in the hollow tube portion and having a camming surface for moving the punch outwardly so as to force a portion of the tube wall into engagement with the die member; a spring normally urging the bar out of camming engagement with the punch; and a member reciprocable coaxially of the arbor for contracting the slotted tube end into engagement with the reduced arbor end and for moving the bar into camming engagement with the punch.

51. In an apparatus of the character described, the combination of an arbor for supporting a tube having a slotted end portion, said arbor having a hollow portion; a punch movable in the cylindrical wall of the hollow arbor portion; an external die member adapted to cooperate with the punch for forming an external raised bead in the tube wall; a bar movable in the hollow tube portion and having a camming surface for moving the punch outwardly so as to force a portion of the tube wall into engagement with the die member; a spring normally urging the bar out of camming engagement with the punch; and a member reciprocable coaxially of the arbor for crimping the slotted tube end inwardly to provide a flange and for moving the bar into camming engagement with the punch.

52. In an apparatus of the character described, the combination of an arbor for supporting a tube; means providing a camming surface and a semi-cylindrical wall against which bears the outer periphery of the tube on the arbor; two members unitarily movable transversely of the arbor and one of the members being also movable relatively to the other member and normally yieldingly urged out of engagement therewith, both members together when engaged forming a semi-cylindrical wall complementary to that of said means and said one member being provided with a die surface and a camming surface, said camming surface cooperating with that of said means during movement of the members toward the arbor thereby moving said one member into engagement with the other member prior to the engagement of the semi-cylindrical wall of both members with the outer periphery of the tube; and means for forcing a tube wall portion into engagement with the die surface for the formation of a raised external bead in the tube wall.

53. Apparatus of the character described comprising, in combination, means for intermittently feeding a strip of material; means for slotting one side of the fed strip at equal distances; means for severing from the fed strip a blank having a slot; means for forming the blank into tubular shape with the slot in one end of the tube; and means for transferring the severed blanks to said forming means.

54. Apparatus of the character described comprising, in combination, means for intermittently feeding a strip of material; means for slotting one side of the fed strip; means for shearing the fed strip across the side edges thereof and through the slots to obtain blanks having two complementary slot portions; means for forming the blanks into tubular shape such that the two slot portions of each form a complete slot in the tube; and means for transferring the severed blanks to said forming means.

55. Apparatus of the character described, comprising, in combination, means for severing slotted blanks from a strip of material having equally spaced slots; means including an arbor for forming a blank into tubular shape; means for transferring severed blanks to said forming means, and means cooperating with said arbor for contracting the slotted tube portion to reduce the same.

56. Apparatus of the character described, comprising, in combination, means for intermittently feeding a strip of material; means for slotting the fed strip at regular intervals; means for severing slotted blanks from the fed strip; means including an arbor for forming a blank into tubular shape; means for transferring severed blanks to said forming means; and means cooperating with said arbor for contracting the slotted tube portion to reduce the same.

57. Apparatus of the character described, comprising, in combination, means for intermittently feeding a strip of material; means for slotting the fed strip at regular intervals; means for severing slotted blanks from the fed strip; an arbor around which a blank is bent to obtain a tubular shape, said arbor having a reduced portion; means for transferring the last severed blank to said arbor; and means for contracting the slotted tube portion into engagement with the reduced arbor portion.

58. Apparatus of the character described, comprising, in combination, means for intermittently feeding a strip of material; means for knurling the fed strip; means for severing knurled blanks from the fed strip; means for forming a blank into tubular shape; and means for transferring a severed blank to said forming means.

59. Apparatus of the character described, comprising, in combination, means including an arbor for forming a blank into tubular shape; and means movable parallel to the arbor axis and cooperating with said arbor for crimping a tube end portion to provide a flange extending substantially at right angles to the tube axis.

60. Apparatus of the character described, comprising in combination, means for severing blanks from a strip of material; means including an arbor for forming a blank into tubular shape; means for transferring a severed blank to said forming means; and means cooperating with said arbor for crimping a tube end portion to provide a flange extending transversely of the tube axis.

61. Apparatus of the character described, comprising, in combination, means including an arbor for forming a blank into tubular shape, a corner of said blank being trimmed off; and means cooperating with said arbor for crimping the trimmed end portion of the tube toward the tube center to provide an annular flange.

62. Apparatus of the character described, comprising, in combination, means including an arbor for forming a blank into tubular shape; and means cooperating with said arbor for forming a bead in the tube wall between cylindrical end portions thereof.

63. Apparatus of the character described, comprising, in combination, means for severing blanks from the strip; means including an arbor for forming a blank into tubular shape; means for transferring a severed blank to said forming means; and means cooperating with said arbor for forming a bead in the tube wall.

64. Apparatus of the character described, comprising, in combination, an arbor supporting a tube; and cooperating members externally and internally of the tube on the arbor for forming a bead in the tube wall, an internal member being carried by the arbor and all members being movable.

65. Apparatus of the character described, comprising, in combination, means including an arbor for forming a blank into tubular shape; and cooperating members externally and internally of the tube on the arbor for forming a bead in the tube wall, an internal member being carried by the arbor and all members being movable.

66. Apparatus of the character described, comprising in combination, means including an arbor for forming a blank into tubular shape, said blank having a slotted side portion; means cooperating with said arbor for contracting the slotted tube portion to reduce the same; and means also cooperating with said arbor for crimping a tube end portion to provide a flange extending transversely of the tube axis.

67. Apparatus of the character described, comprising, in combination, means for severing slotted blanks from a strip of material having equally spaced slots; means including an arbor for forming a blank into tubular shape; means for transferring a severed blank to said forming means; means cooperating with said arbor for contracting the slotted tube portion to reduce the same; and means also cooperating with said arbor for crimping a tube end portion to provide a flange extending transversely of the tube axis.

68. Apparatus of the character described, comprising, in combination, means for intermittently feeding a strip of material; means for slotting the fed strip at regular intervals; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for crimping a tube end portion to provide a flange extending transversely of the tube axis.

69. Apparatus of the character described, comprising, in combination, means for intermittently feeding a strip of material having equally spaced slots; means for knurling the fed strip; means for severing slotted blanks from the fed strip; means including an arbor for forming a blank into tubular shape; means for transferring a severed blank to said forming means; and means cooperating with said arbor for contracting the slotted tube portion to reduce the same.

70. Apparatus of the character described, comprising, in combination, means for intermittently feeding a strip of material; means for knurling the fed strip; means for slotting the fed strip at regular intervals; means for severing slotted blanks from the fed strip; means including an arbor for forming a blank into tubular shape; means for transferring a severed blank to said forming means; and means cooperating with said arbor for contracting the slotted tube portion to reduce the same.

71. Apparatus of the character described, comprising in combination, means including an arbor for forming a slotted blank into tubular shape; means cooperating with said arbor for contracting the slotted tube portion; and means also cooperating with said arbor for forming a bead in the tube wall.

72. Apparatus of the character described, comprising, in combination, means for severing slotted blanks from a strip of material having equally spaced slots; means including an arbor for forming a blank into tubular shape; means for transferring a severed blank to said forming means; means cooperating with said arbor for contracting the slotted tube portion to reduce the same; and means also cooperating with said arbor for forming a bead in the tube wall.

73. Apparatus of the character described, comprising, in combination, means for intermittently feeding a strip of material; means for slotting the fed strip at regular intervals; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for forming a bead in the tube wall.

74. Apparatus of the character described, comprising, in combination, means for intermittently feeding a strip of material; means for knurling the fed strip; means for severing knurled blanks from the fed strip; means for forming a blank into tubular shape; and means for transferring a severed blank to said forming means.

75. Apparatus of the character described, comprising in combination, means for intermittently feeding a strip of material; means for knurling the fed strip; means for severing blanks from the fed strip; means including an arbor for forming a blank into tubular shape; means for transferring a severed blank to said forming means; and means cooperating with said arbor for crimping a tube end portion to provide a flange extending transversely of the tube axis.

76. Apparatus of the character described, comprising, in combination, means for intermittently feeding a strip of material; means for knurling the fed strip; means for severing blanks from the fed strip; means including an arbor for forming a blank into tubular shape; means for transferring a severed blank to said forming means; and means cooperating with said arbor for forming a bead in the tube wall.

77. Apparatus of the character described, comprising, in combination, means including an arbor for forming a blank into tubular shape; means cooperating with said arbor for crimping a tube end portion to provide a flange extending transversely of the tube axis; and means also cooperating with said arbor for forming a bead in the tube wall.

78. Apparatus of the character described, comprising, in combination, means for intermittently feeding a strip of material having equally spaced slots; means for knurling the fed strip; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for crimping a tube end portion to provide a flange extending transversely of the tube axis.

79. Apparatus of the character described, comprising, in combination, means for intermittently feeding a strip of material; means for knurling the fed strip; means for slotting the fed strip at regular intervals; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for crimping the tube end portion to provide a flange extending transversely of the tube axis.

80. Apparatus of the character described, comprising, in combination, means for intermittently feeding a strip of material having equally spaced slots; means for knurling the fed strip; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for forming a bead in the tube wall.

81. Apparatus of the character described, comprising, in combination, means for intermittently feeding a strip of material; means for knurling the fed strip; means for slotting the fed strip at regular intervals; means for severing slotted blanks from the fed strip; means including an arbor for forming a blank into tubular shape; means for transferring a severed blank to said forming means; means cooperating with said arbor for contracting the slotted tube portion to reduce the same; and means also cooperating with said arbor for forming a bead in the tube wall.

82. Apparatus of the character described, comprising, in combination, means including an arbor for forming a slotted blank into tubular shape; means cooperating with said arbor for contracting the slotted tube portion to reduce the same; means also cooperating with said arbor for crimping a tube end portion to provide a flange extending transversely of the tube axis; and means also cooperating with said arbor for forming a bead in the tube wall.

83. Apparatus of the character described, comprising, in combination, means for severing slotted blanks from a strip of material having equally spaced slots; means including an arbor for forming a slotted blank into tubular shape; means for transferring a severed blank to said forming means; means cooperating with said arbor for contracting the slotted tube portion to reduce the same; means also cooperating with said arbor for crimping a tube end portion to provide a flange extending transversely of the tube axis; and means also cooperating with said arbor for forming a bead in the tube wall.

84. Apparatus of the character described comprising, in combination, means for intermittently feeding a strip of material; means for slotting the fed strip at regular intervals; means for severing slotted blanks from the fed strip; means including an arbor for forming a blank into tubular shape; means for transferring a severed blank to said forming means; means including said arbor for contracting the slotted tube portion to reduce the same; means cooperating with said arbor for crimping a tube end portion to provide a flange extending transversely of the tube axis; and means also cooperating with said arbor for forming a bead in the tube wall.

85. Apparatus of the character described, comprising in combination, means for intermittently feeding a strip of material; means for knurling the fed strip; means for severing blanks from the fed strip; means including an arbor for forming a blank into tubular shape; means for transferring a severed blank to said forming means; means cooperating with said forming means for crimping a tube end portion to provide a flange extending transversely of the tube axis; and means also cooperating with said arbor for forming a bead in the tube wall.

86. Apparatus of the character described, comprising in combination, means for intermittently feeding a strip of material; means for knurling the fed strip; means for slotting the fed strip at regular intervals; means for severing slotted blanks from the fed strip; means including an arbor for forming a blank into tubular shape; means for transferring a severed blank to said forming means; means cooperating with said arbor for crimping a tube end portion to provide a flange extending transversely of the tube axis; and means also cooperating with said arbor for forming a bead in the tube wall.

87. Apparatus of the character described, comprising in combination, means for intermittently feeding a strip of material; means for knurling the fed strip; means for slotting the fed strip at regular intervals; means for severing slotted blanks from the fed strip; means including an arbor for forming a blank into tubular shape; means for transferring a severed blank to said forming means; means cooperating with said arbor for contracting the slotted tube portion to reduce the same; means also cooperating with said arbor for crimping a tube end portion to provide a flange extending transversely of the tube axis; and means also cooperating with said arbor for forming a bead in the tube wall.

88. Apparatus of the character described, comprising in combination, means for bending two opposite end portions of a blank out of the plane thereof; means for forming the bent blank into tubular shape; and means for transferring a blank from the bending means to the forming means, thereby also ejecting a finished tube from the latter.

89. Apparatus of the character described, comprising in combination, means for bending two opposite end portions of a blank out of the plane thereof; means for pre-forming a portion of a blank intermediate its bent end portions into part-tubular shape; means for forming the pre-formed blank into tubular shape; and means for transferring a blank from the bending means to the pre-forming means, thereby also advancing a partially shaped tube from the pre-forming means to the forming means.

CLARENCE J. KELLER.